United States Patent
Marzban et al.

(10) Patent No.: US 12,413,997 B2
(45) Date of Patent: Sep. 9, 2025

(54) INTERFERENCE DATA COLLECTION WITH BEAM INFORMATION FOR ML-BASED INTERFERENCE PREDICTION

(71) Applicant: QUALCOMM Incorporated, San Diego, CA (US)

(72) Inventors: Mohamed Fouad Ahmed Marzban, San Diego, CA (US); Wooseok Nam, San Diego, CA (US); Tao Luo, San Diego, CA (US); Taesang Yoo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 17/932,191

(22) Filed: Sep. 14, 2022

(65) Prior Publication Data

US 2024/0089769 A1     Mar. 14, 2024

(51) Int. Cl.
*H04W 16/28* (2009.01)
*H04B 17/336* (2015.01)
*H04W 24/10* (2009.01)
*H04W 56/00* (2009.01)

(52) U.S. Cl.
CPC .......... *H04W 24/10* (2013.01); *H04B 17/336* (2015.01); *H04W 16/28* (2013.01); *H04W 56/001* (2013.01)

(58) Field of Classification Search
CPC ... H04W 24/10; H04W 16/28; H04W 56/001; H04B 17/336; H04B 17/345
See application file for complete search history.

(56) References Cited

U.S. PATENT DOCUMENTS

| | | | |
|---|---|---|---|
| 2023/0189038 A1* | 6/2023 | Frenne | H04B 7/0632 370/252 |
| 2023/0246791 A1* | 8/2023 | Peng | H04W 72/541 370/329 |
| 2024/0090008 A1* | 3/2024 | Fan | H04W 24/10 |
| 2024/0171294 A1* | 5/2024 | Choi | H04L 5/0094 |
| 2024/0314058 A1* | 9/2024 | Mueck | H04L 41/40 |

* cited by examiner

*Primary Examiner* — Lakeram Jangbahadur
(74) *Attorney, Agent, or Firm* — Procopio, Cory, Hargreaves & Savitch LLP

(57) ABSTRACT

An apparatus for wireless communication at a UE is provided. The apparatus is configured to receive a configuration to report interference measurement information indicating interference measurements for each interference measurement resource of a set of interference measurement resources and Rx beam information used by the UE for performing interference measurements on each interference measurement resource of the set of interference measurement resources. The apparatus is configured to receive a set of interference measurement reference signals on the set of interference measurement resources, and to measure interference on each interference measurement resource of the set of interference measurement resources to obtain the interference measurement information. Each interference measurement is through one Rx beam of a set of Rx beams. The apparatus is configured to transmit, in response to the received set of interference reference signals on the set of interference measurement resources, the interference measurement information, and corresponding Rx beam information.

30 Claims, 17 Drawing Sheets

INTERFERENCE DATA COLLECTION WITH BEAM INFORMATION FOR ML-BASED INTERFERENCE PREDICTION

TECHNICAL FIELD

The present disclosure relates generally to communication systems, and particularly, to method and apparatus of interference data collection with beam information for machine learning (ML) based interference prediction.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a memory and at least one processor coupled to the memory. Based at least in part on information stored in the memory, the at least one processor may be configured to configure a user equipment (UE) to report interference measurement information indicating interference measurements for each interference measurement resource of a set of interference measurement resources and receive (Rx) beam information of the UE for performing interference measurements on each interference measurement resource of the set of interference measurement resources. The at least one processor may be further configured to transmit a set of interference measurement reference signals on the set of interference measurement resources for the UE, and receive, in response to the transmitted set of interference reference signals on the set of interference measurement resources, the interference measurement information and the corresponding Rx beam information.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
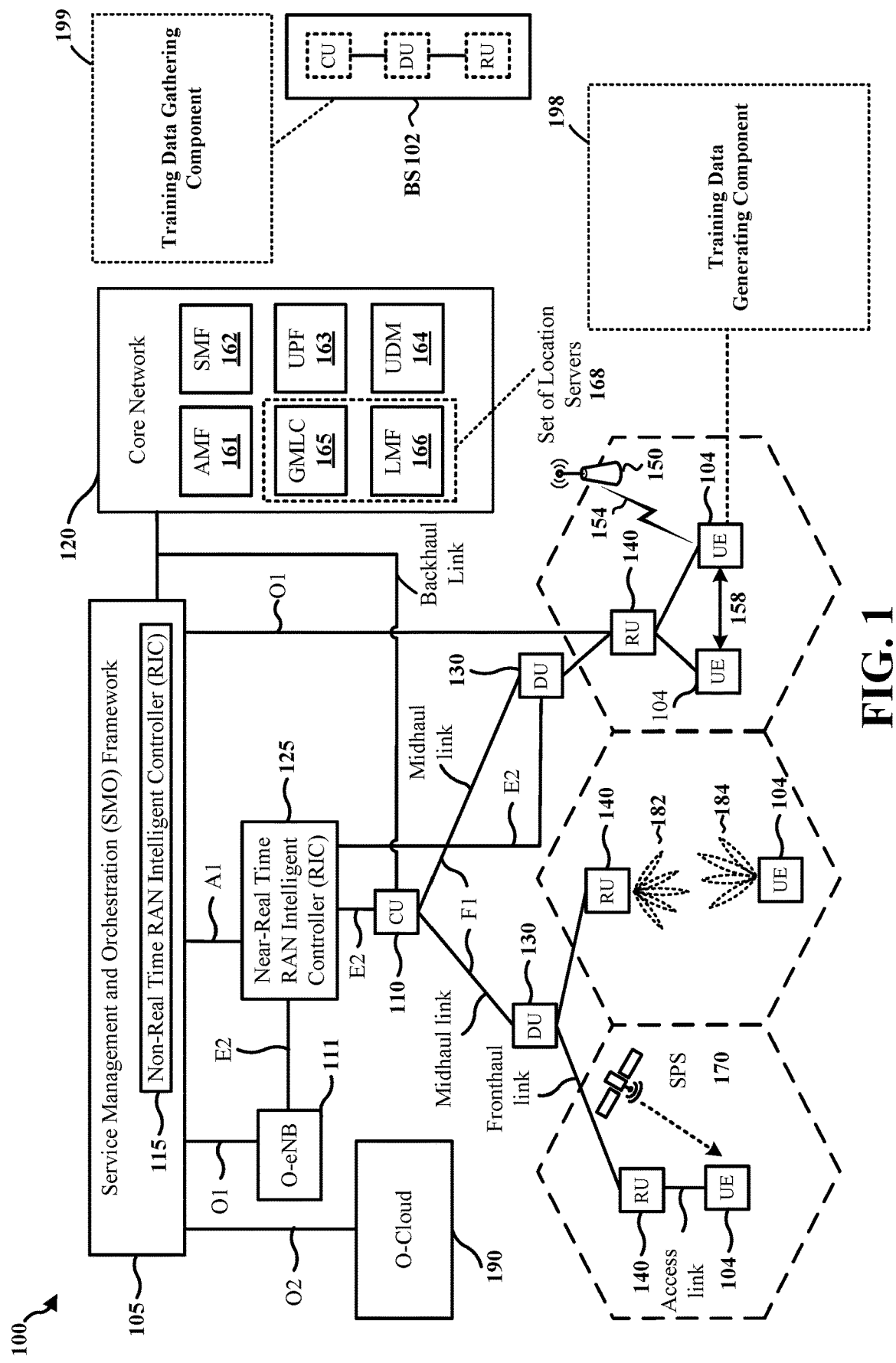
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface)

connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to include a training data generating component 198. In certain aspects, the base station 102 may be configured to include a training data gathering component 199. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channel. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
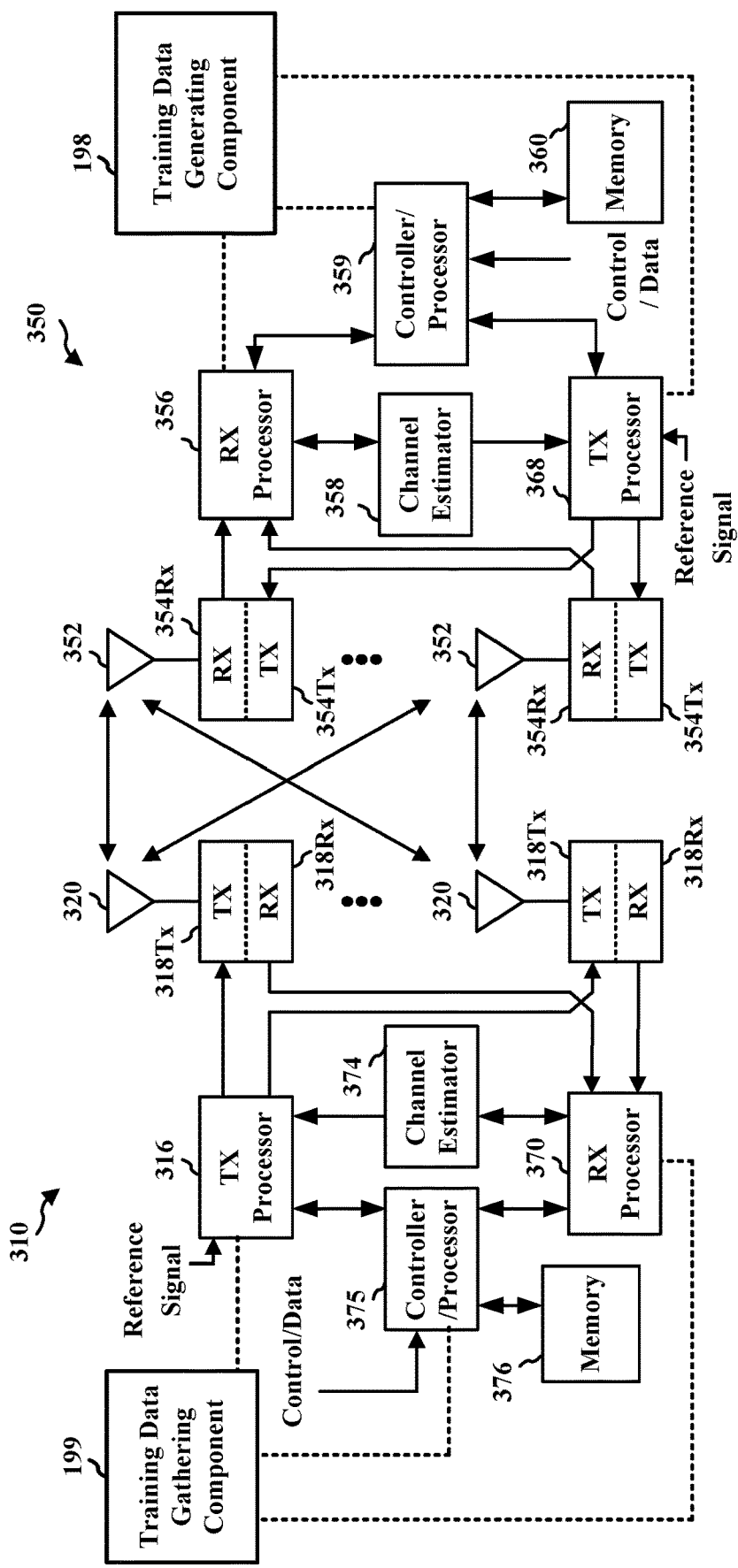
FIG. 3 is a diagram illustrating an example of a base station (BS) and a user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the training data generating component 198 of FIG. 1.

At least one of the TX processor 316, the RX processor 370, and the controller/processor 375 may be configured to perform aspects in connection with the training data gathering component 199 of FIG. 1.

In 5G NR, slot structures may be more flexible than earlier technology (e.g., 4G LTE) slots structures. For example, slot structures in 5G NR allow for very short symbol length/duration (referred to as "mini-slot") to enable communications of very low latency, such as URLLC. In addition, 5G NR slot structures allow for a short burst of transmission within a regular eMBB slot that starts at arbitrary symbol locations. Further, 5G NR also allows unscheduled uplink transmissions without a grant (i.e., resource request), beam-based transmissions (e.g., interference fluctuates with beam changes, including beam refinements), and highly adaptive reference signal patterns, such as DM-RS and CSI-RS patterns, which may vary based on the number of antenna ports, the delay tolerance, and the doppler spread.

However, the flexible slot structures of 5G NR may result in dynamically changing inter-cell interference that are, due to their dynamic characteristics, difficult to accurately estimate or predict with a regular parameterized model. That is, it may be hard to fit a well parameterized model to the interference observed at all UEs. Hence, a method and apparatus that can accurately estimate or predict the interference behavior of various network entities in 5G NR is urgently needed. An AI-based approach to observe the characteristics of interference variations and predict the interference behavior on future resources is provided below.

An ML-based interference prediction algorithm that utilizes an ML-based approach to predict the interference behavior on future resources based on the observed characteristics of interference variations is provided below. The interference observed at the UEs may vary in the temporal, frequency, and spatial domains, and also may correlate with time, frequency, and spatial domains. By learning interference correlations associated with previous resources, a UE may predict interference on future resources. With respect to application of the interference prediction algorithm, a UE/network entity may predict an interference profile over a frequency/time resource grid for future symbols/slots. If some resources are expected to be of high interference, those resources may be avoided from resource allocation. For the usable resources (i.e., not excluded), the time/frequency correlation of the interference to be used in demodulation may be predicted. The BS may use the predicted interference information to determine a reference signal design for demodulation and improved interference estimation at the UE.

Figure 4:
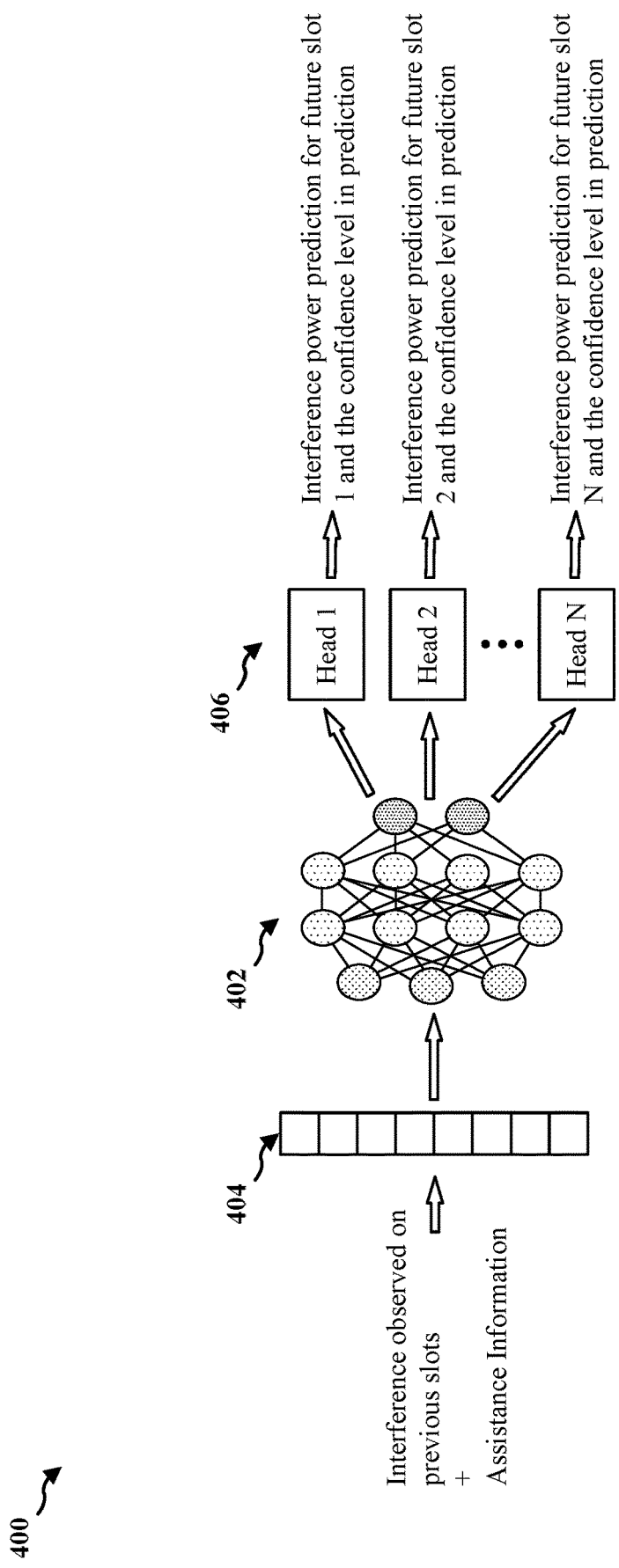
FIG. 4 is a diagram illustrating an ML-based probabilistic interference prediction scheme in accordance with various aspects of the present disclosure.

FIG. 4 is a diagram 400 illustrating an ML-based probabilistic interference prediction scheme in accordance with various aspects of the present disclosure. The goal of the interference prediction scheme is to utilize the interference correlation properties to predict the interference on future resources. The scheme is a probabilistic approach for interference prediction to account for the statistical behavior of the interference and to obtain the confidence level in the predicted interference.

As illustrated in FIG. 4, the interference prediction scheme may include an ML model 402. The ML model 402 may be a supervised learning ML model. In some aspects, the ML model 402 may include a computer neural network that contains one or more layers of artificial neurons or nodes and may be trained with the interference data collected on various entities of the access network. The input 404 to the ML model 402 may include the interference observed on previous resources (e.g., previous slots) and the assistance information. The output 406 of the ML model 402 may include predicted interference measurements, such as the interference power prediction for one or more future slots. The output 406 of the ML model 402 may further include the corresponding confidence level for each prediction. For example, as illustrated in FIG. 4, the output 406 may include the interference power predicted for future slots 1, 2, . . . , and N, and the corresponding confidence level in each interference power prediction.

Figure 5:
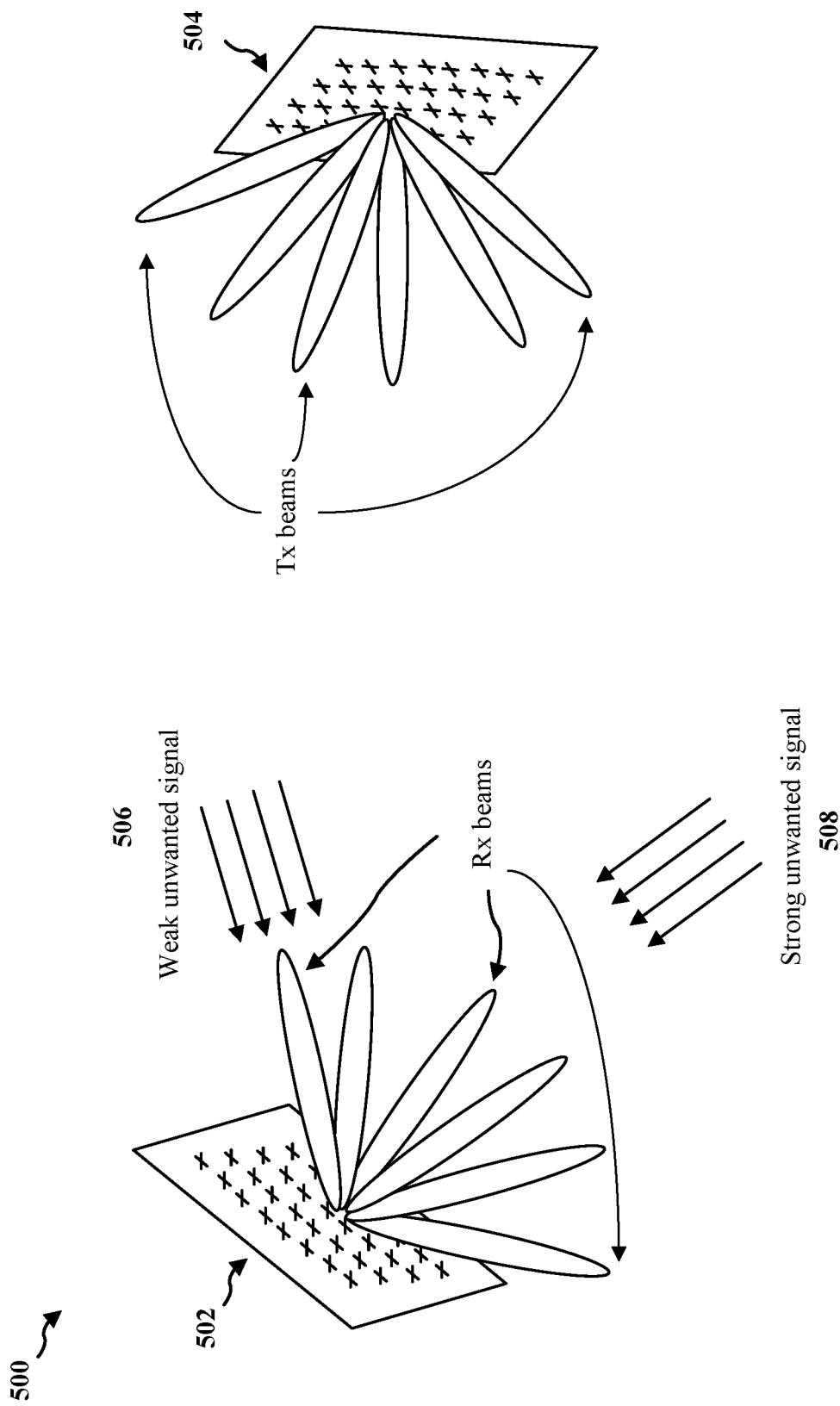
FIG. 5 is a diagram illustrating transmission at a BS, reception and interference at a UE.

FIG. 5 is a diagram 500 illustrating transmission at a BS 504 through one or more transmit (Tx) beams, reception at a UE 502 through one or more Rx beams, and interference at the UE 502. The interference observed at the UE may vary according to the directions of the Rx beam and the Tx beam, respectively. As the UE 502 changes its Rx beam, the UE 502 can observe a substantially different interference on transmissions through one or more Tx beams from the BS 504 due to the directivity of the Rx beam and the Tx beam, and the directivity of the observed interference 506, 508. To predict the interference on future resources (e.g., in a specific slot, sub-band, and Rx-beam), the ML algorithm may need to know the Rx beam (and in some configurations, the Tx beam) corresponding to each previous interference measurement.

Figure 6:
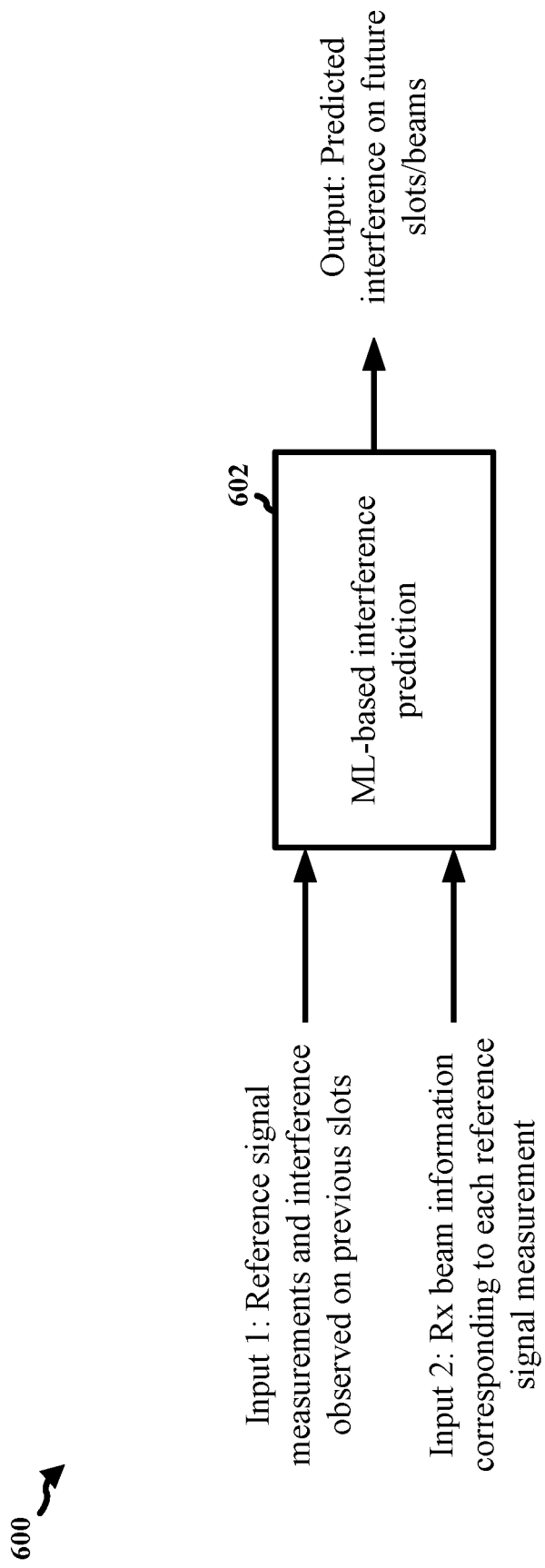
FIG. 6 is a diagram illustrating the ML design for interference prediction with beam information in accordance with various aspects of the present disclosure.

FIG. 6 is a diagram 600 illustrating the ML design for interference prediction with beam information in accordance with various aspects of the present disclosure. In the ML design, the beam information may be fed as input to the ML model for interference prediction on future resources, and the ML algorithm may learn the correspondence between the interference values and the associated beams, which may help the ML algorithm in predicting the interference on future resources. In one example, as illustrated in FIG. 6, the input to the ML model 602 for ML-based interference prediction may include two components. The first component (i.e., Input 1) may be the reference signal measurements and interference observed on previous slots. The second component (i.e., Input 2) may be Rx beam information corresponding to each reference signal measurement. The output of the ML model 602 may be predicted interference on future slots/beams.

The basis of supervised learning ML models is the availability of labelled data, which allows ML algorithms to build an accurate understanding of the behavior and trends leading to the prediction. To train a robust ML-based interference prediction model, a diverse interference dataset is needed to cover the interference experienced in different environments. Examples of the interference experienced may include, but is not limited to, interference experienced at high-density UE deployment versus low-density UE deployment, in-door interference versus outdoor interference, interference experienced at high mobility versus low mobility scenarios, interference experienced at different traffic types (e.g., FTP, VoIP, cloud gaming, video streaming, conference call, and extended reality (XR)), interference experienced for different use cases (e.g., eMBB, URLLC, mMTC), interference experienced at different supplementary cellular systems (SCS), different loading/resource utilizations, different numbers of active UEs, different numbers of active beams, different numbers of transmission configuration indication (TCI) states at interfering BSs, and interference experienced at different scheduling schemes (e.g., proportional fair, round robin).

The collection of the diverse interference dataset may be performed at one or more UEs and possibly at one or more BSs. The training of the ML model may generally be performed at the BS/network side, as a UE typically may not have access to the diverse interference dataset. After the ML model is trained, the BS/network may share the trained ML model with the UE in the access network. The sharing procedure may be performed offline and infrequently. Once the trained ML model is shared with the UE, inference prediction may be performed by the UE using the trained ML model.

Generally, a BS may not have the Rx beam information needed to train an ML model. Hence, the UE may associate the Rx beam information with the corresponding interference data reporting during the data collection phase to help the BS/network in training a robust ML algorithm that can generalize well to work in different environments and operating conditions.

Figure 7:
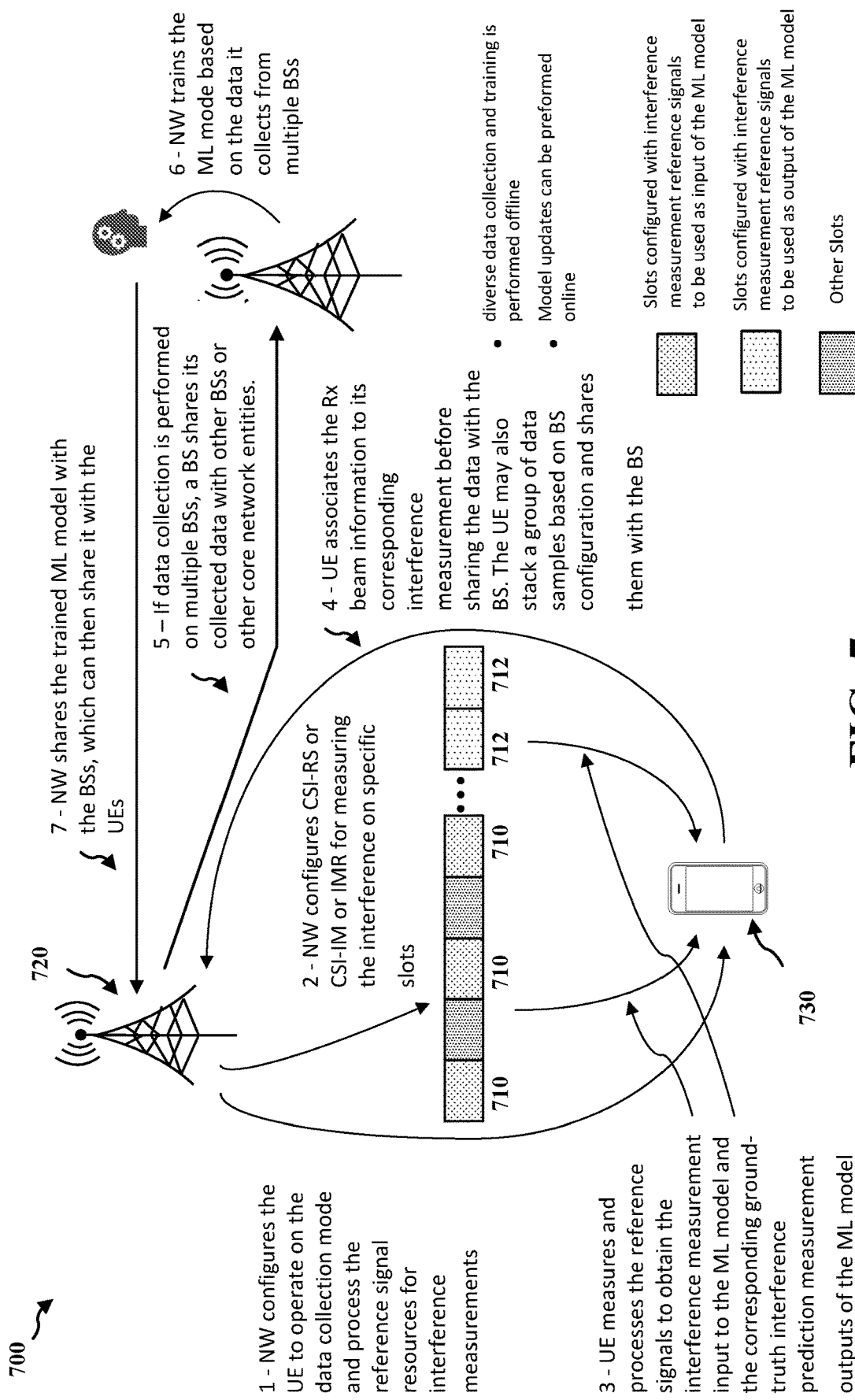
FIG. 7 is a diagram illustrating the data collection procedures for interference prediction in accordance with various aspects of the present disclosure.

FIG. 7 is a diagram 700 illustrating the data collection procedures for interference prediction in accordance with various aspects of the present disclosure. As illustrated in FIG. 7, at 1, a network entity (NW) 720 (i.e., BS and/or other network nodes) may configure the UE 730 to operate on a data collection mode and process the reference signal resources for interference measurements. At 2, the NW may configure CSI-RS, a channel state information interference measurement (CSI-IM), or an interference measurement resource (IMR) for measuring the interference on specific slots. As illustrated in FIG. 7, some slots (e.g., 710) may be configured with interference measurement reference signals to be used as input of the ML model, while some other slots (e.g., 712) may be configured with interference measurement reference signals to be used for computing the output of the ML model. At 3, the UE 730 may measure and process the reference signals to obtain the interference measurement input to the ML model and the corresponding ground-truth interference prediction measurement outputs of the ML model. At 4, the UE 730 may associate the Rx beam information to the corresponding interference measurement before sharing the data with the BS. In one configuration, the UE 730 may stack a group of data samples (including processed interference measurements for ML model input and processed interference measurements for ML model outputs) based on a BS configuration and share them with the BS. At 5, in one configuration, the data collection may be performed at multiple BSs to obtain a diverse dataset, and one BS of the multiple BSs may share its collected data with other BSs or other core network entities. At 6, the NW may train the ML model based on the data the NW collects from multiple BSs. The training may be performed offline (model updates may be performed, though). At 7, after the ML model has been trained, the NW may share the trained ML model with the BSs, and the BSs may further share the trained ML model with the UEs.

Figure 8:
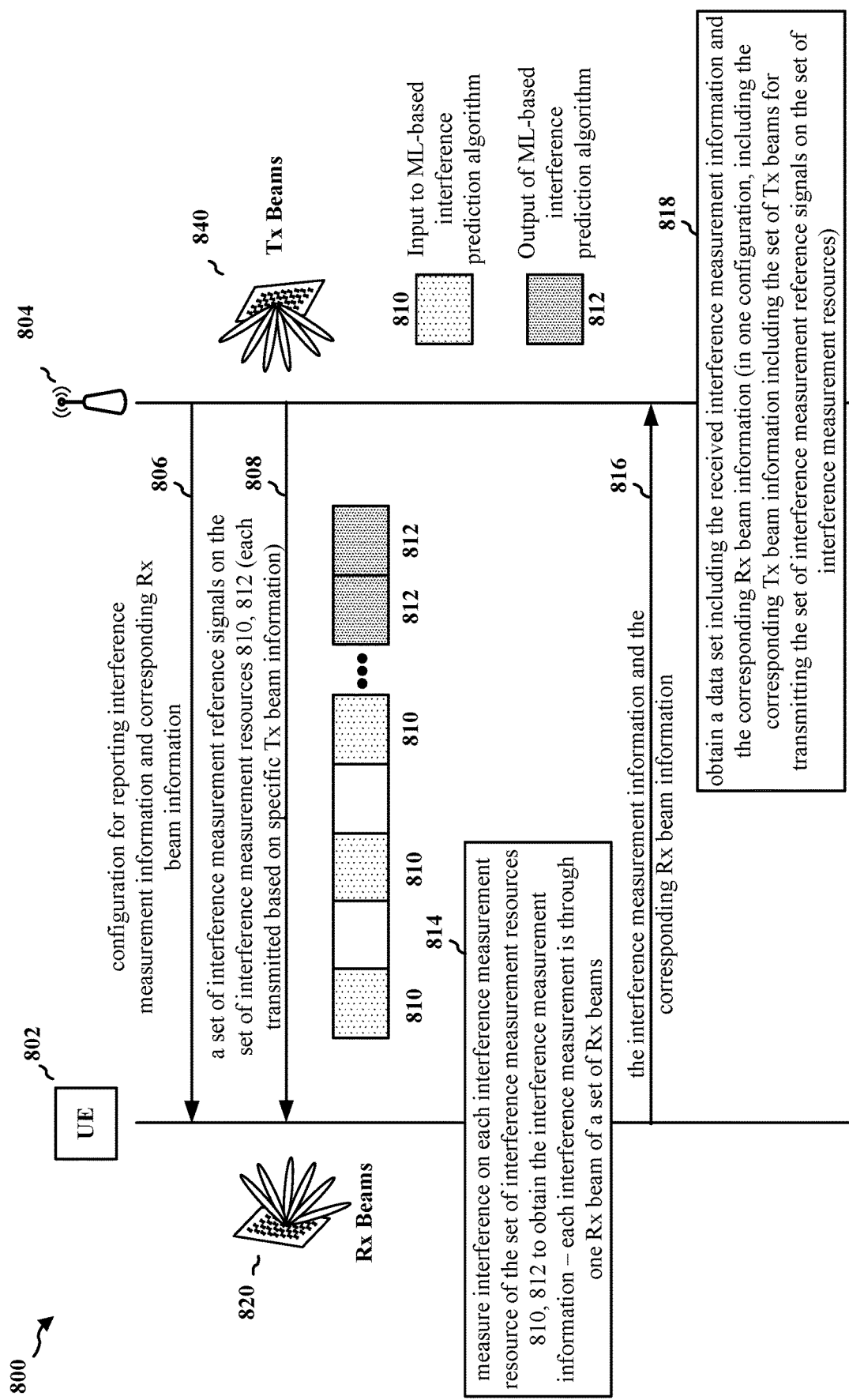
FIG. 8 is a call flow diagram illustrating a method of interference prediction with beam information in accordance with various aspects of the present disclosure.

FIG. 8 is a call flow diagram 800 illustrating a method of interference prediction with beam information in accordance with various aspects of the present disclosure. As illustrated in FIG. 8, the network entity 804 may transmit, at 806, to the UE 802, the configuration for reporting interference measurement information and corresponding Rx beam information. In some aspects, the network work entity 804 may be a base station. The network entity 804 may further transmit, at 808, to the UE 802, a set of interference measurement reference signals on the set of interference measurement resources 810, 812. Each of the transmitted interference measurement reference signals may be transmitted based on specific Tx beam information (e.g., beam direction or other Tx parameters). In one example, as illustrated in FIG. 8, the set of interference measurement resources may include slots 810, 812. Slots 810 may include the RS input to the ML-based interference prediction algorithm, and slots 812 may include the RS for computing the output to the ML-based interference prediction algorithm. At 814, the UE 802 may measure interference on each interference measurement resource of the set of interference measurement reference resources 810, 812 to obtain the interference measurement information. Each interference measurement may be through one Rx beam of a set of Rx beams 820. Then, the UE 802 may send 816 the interference measurement information and the corresponding Rx beam information to the network entity 804. At 818, the network entity 804 may obtain a data set including the interference measurement information and the corresponding Rx beam information received from the network entity 804. In one configuration, the data set may further include corresponding Tx beam information associated with the transmission (at 808) for the interference measurement information. The Tx beam information may include the set of Tx beams 840 for transmitting, at 808, the set of interference measurement reference signals on the set of interference measurement resources 810, 812.

In some aspects, the NW may configure the UE with two groups of interference measurement resources (e.g., CSI-RS, CSI-IM, IMR) (at 810, 812). The NW may configure the UE to process the measurements in the first group of reference signals (on 810) to generate the interference characteristics inputs of the ML model. For example, the interference characteristics inputs may include, but are not limited to, interference power, interference-plus-noise power, signal to interference plus noise ratio (SINR), CSI estimations (e.g., CQI, PMI, RI, etc.) on a specific set of resources, and/or a processed version of reference signal measurements.

The NW may configure the UE to process the second group of reference signals (on 812, which proceed the first group of reference signals on 810) to generate the ground-truth output of the ML model. Examples of the ground-truth output may include, but are not limited to, interference power, interference-plus-noise power, or SINR on these resources. The UE may measure an interference characteristic and report the metric to the BS. The measured interference characteristic may include, but is not limited to, interference power, interference-plus-noise power, and SINR. In some aspects, the reporting may include more than one interference characteristics.

Figure 9:
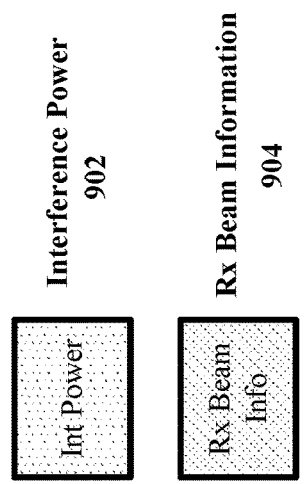
FIG. 9 is a diagram illustrating the association of the Rx beam information with the corresponding interference data in accordance with various aspects of the present disclosure.

FIG. 9 is a diagram 900 illustrating the association of the Rx beam information with the corresponding interference data in accordance with various aspects of the present disclosure. During the interference data collection, the NW may configure the UE (at 806) to report changes in the Rx beam (at 816). Changing the Rx beam is typically a UE implementation. However, changing the Rx beam may have a substantial effect on the dynamics of the interference variation over time. Hence, collecting the Rx beam information is essential to training a robust ML model. The UE may associate the Rx beam information along with the interference information data to help the NW in training a more robust ML model. The NW may configure (at 806) the UE to report changes (at 816) in the Rx beam at the UE side along with the interference information data. That is, in one configuration, at 816, the UE may periodically transmit interference measurement information and corresponding Rx beam information to the network entity 804. The changes in the Rx beam may be reported at 816 in various ways. In one configuration, the UE may report the azimuth and elevation beam angles, beam width, and the beam gains of the Rx beam corresponding to each interference measurement resource. In one configuration, to reduce the transmission overhead, instead of reporting the actual beams, the UE may report the variation in the Rx beam angles along with the interference information for each interference measurement resource. In one configuration, as another way to reduce the reporting overhead, the full range of Rx beam angles may be divided into intervals, and the UE may report the interval index with the interference information for each interference measurement resource.

In some aspects, the NW may configure (at 806) the UE not to change the Rx beam (at 808) or only use one specific Rx beam (at 808) for a specific window of time during the interference data collection (at 808). The interference may change over time according to some patterns, such as the changes in scheduling and interfering beam at the neighboring cells, and the changes in the UE orientation. To learn these patterns, the ML algorithm may need to observe how the interference changes on the same Rx beam for a specific time window. Hence, the NW may configure (at 806) the UE to use a specific Rx beam (at 808) for a specific window during the data collection process. The NW may specify the duration in which the UE either does not change its Rx beam or only uses one specific Rx beam. The duration may be specified in terms of the unit time (e.g., in ms, us), the number of slots, or the number of interference measurements. Additionally, multiple resource sets may be simultaneously configured, each of which may be associated with a certain Rx beam.

Figure 10:
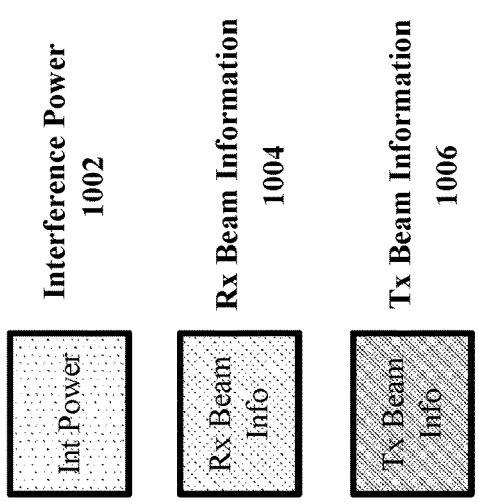
FIG. 10 is a diagram illustrating the association of the Tx beam information with the corresponding interference data in accordance with various aspects of the present disclosure.

FIG. 10 is a diagram 1000 illustrating the association of the Tx beam information with the corresponding interference data in accordance with various aspects of the present disclosure. The interference measurement resources and the reference signals used to measure the interference may be associated with a Tx beam used for transmitting the interference measurement reference signals at 808. Hence, the quality of the interference power measurements may depend on the Tx beam. Additionally, some interference characteristics may be highly dependent on the Tx beam information. For example, SINR may be highly dependent on the Tx beam information due to the numerator term in the SINR. Hence associating the Tx beam with interference data may help the NW in training a more robust ML model that can predict the interference on future resources.

In some aspects, the Tx beam information may be associated with the corresponding interference data by a network node (e.g., a BS or a UE). In one example, a BS may be the network node that associates the Tx beam information, and the BS may share the interference data (with the Tx beam information associated) with other network nodes. In another example, a UE may be the network node that associates the Tx beam information with the corresponding interference data, and as illustrated in FIG. 10, UE may further share the interference data (with the Tx beam information associated) with the BS. The BS may further share the interference data with other network nodes.

The Tx beam information may be associated with the corresponding interference data in various ways. In one configuration, the NW/UE may associate the azimuth and elevation beam angles and the beam gains of the Tx beams with the corresponding interference data. In one configuration, the NW/UE may associate the SSB beam index corresponding to the Tx beam used in transmission with the corresponding interference data. In one configuration, the NW/UE may associate the variation in the Tx beam with the corresponding interference data.

Since the training of the ML model is typically performed offline, the UE may buffer the interference measurements along with the beam information and report a large amount of data together at 816 to reduce the reporting overhead. The NW may configure the buffer duration in terms of the number of samples (e.g., 1000 or 10,000 training samples) or data size (e.g., 1 MB, 100 MB, or 1 GB), or time (e.g., interference measurements during a period of 10 ms, a few second, or several slots), or time series length before sharing the data with the NW. The UE may associate a timestamp with the buffered interference measurements (after BS configurations). Since the UE may buffer the interference measurements for a relatively long period of time, and some measurements in this period of time could be missing, it may be important to preserve timestamp information with interference measurements to help the NW to understand the dynamics of the interference variations over time. For example, the UE could be configured with IMR on various slots, such as slots 1, 4, etc., and some measurements may be missing. If the UE did not associate the timestamp information with the interference measurements, the NW may not know that the first two measurements are separated by three slots, and the data could be less useful in this case. The timestamp may be in absolute time or the slots/symbol index relative to the first slot in the series.

The UE may report the maximum buffer size the UE can utilize (e.g., in terms of the number of training samples, data size, or buffering time) for storing the training data before sharing the training data with the NW. To save the buffer space, the UE may also request to share the collected interference prediction data. Due to the large size of the collected data, the UE may report the collected data on a PUSCH resource (based on the configuration from the NW).

Additionally, before the UE receives (at 806) a configuration for reporting interference measurement information and corresponding Rx beam information from the BS, the UE may report its capability for supporting the interference data collection (with beam information). This information may allow the BS to select the UEs that can participate in the data collection.

Figure 11:
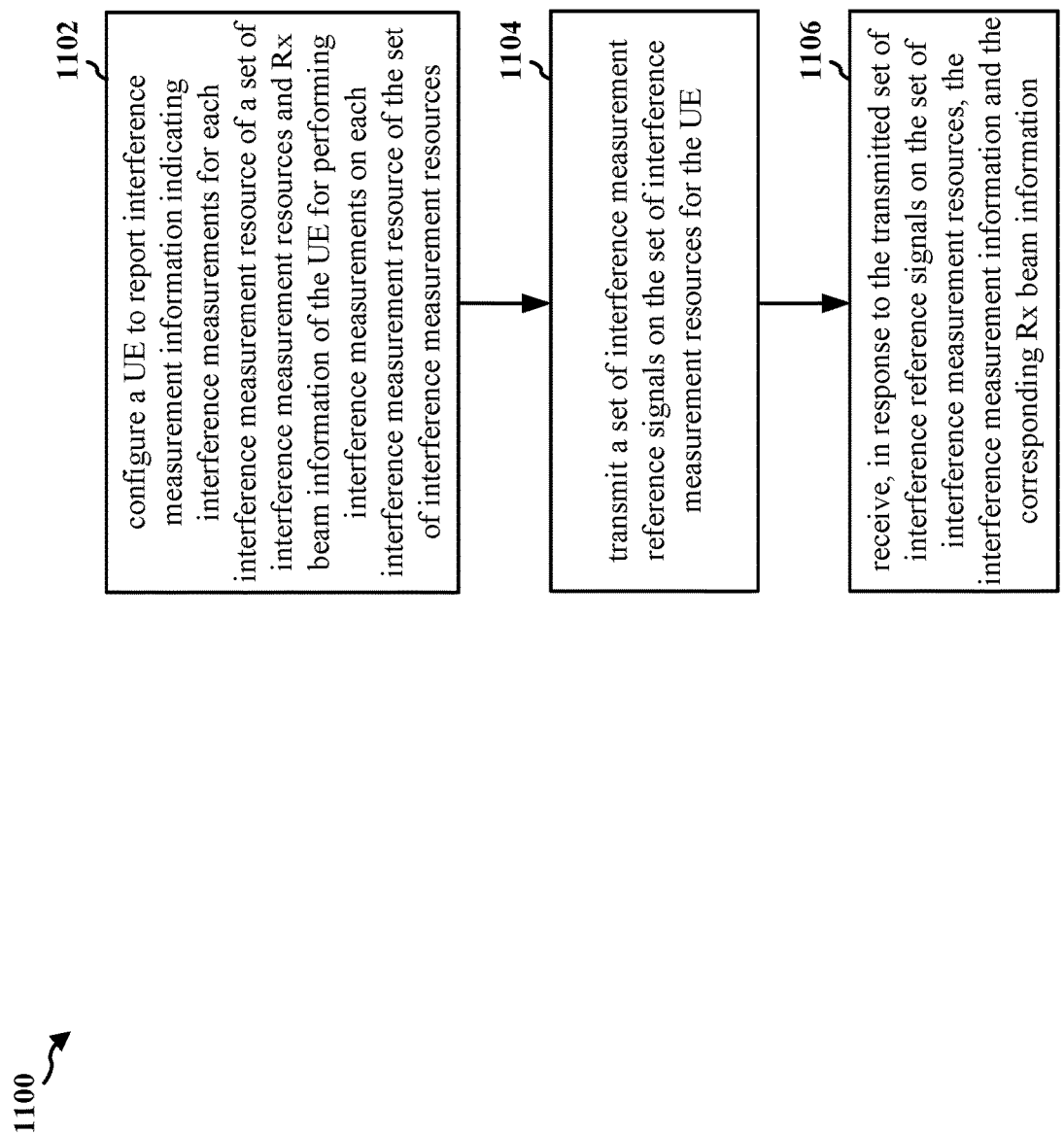
FIG. 11 is a first flowchart of a method of wireless communication at a network entity in accordance with various aspects of the present disclosure.

FIG. 11 is a flowchart 1100 of a method of wireless communication at a network entity in accordance with various aspects of the present disclosure. The method may be performed by a network entity. The network entity may be a base station, or a component of a base station, in the access network of FIG. 1 or a core network component (e.g., base station 102, 310; CU 110; DU 130; RU 140; network entity 720, 804; or network entity 1502 in the hardware implementation of FIG. 15). The method utilizes ML-based models to incorporate beam information for interference prediction, and thus improves the accuracy of predicting the interference behaviors on future resources.

As shown in FIG. 11, at 1102, the network entity may configure a UE to report interference measurement information indicating interference measurements for each interference measurement resource of a set of interference measurement resources and Rx beam information of the UE for performing interference measurements on each interference measurement resource of the set of interference measurement resources. The UE may be the UE 104, 350, 502, 730, 802, or the apparatus 1504 in the hardware implementation of FIG. 15. FIGS. 7 and 8 illustrate various aspects of the network entity configuring a UE to report interference measurement information for each interference measurement resource of a set of interference measurement resources and Rx beam information of the UE. For example, referring to FIGS. 7 and 8, the network entity 720/804 may configure, at 806, a UE 730/802 to report interference measurement information (see 1 of FIG. 7) indicating interference measurements for each interference measurement resource 710/810, 712/812 of a set of interference measurement resources 710/810, 712/812 and Rx beam information (820) of the UE 730/802 for performing interference measurements on each interference measurement resource 710/810, 712/812 of the set of interference measurement resources 710/810, 712/812.

At 1104, the network entity may transmit a set of interference measurement reference signals on the set of interference measurement resources for the UE. FIGS. 7 and 8 illustrate various aspects of the network entity transmitting a set of interference measurement reference signals on the set of interference measurement resources for the UE. For example, referring to FIGS. 7 and 8, the network entity 720/804 may transmit, at 808 (see also 2 of FIG. 7), a set of interference measurement reference signals (e.g., CSI-RS, CSI-IM, IMR) on the set of interference measurement resources 710/810, 712/812 for the UE 730/802.

At 1106, the network entity may receive, in response to the transmitted set of interference reference signals on the set of interference measurement resources, the interference measurement information, and the corresponding Rx beam information. For example, the network entity 720/804 may receive, at 816 (see also 4 of FIG. 7), in response to the transmitted set of interference reference signals on the set of interference measurement resources 710/810, 712/812, the interference measurement information, and the corresponding Rx beam information.

Figure 12:
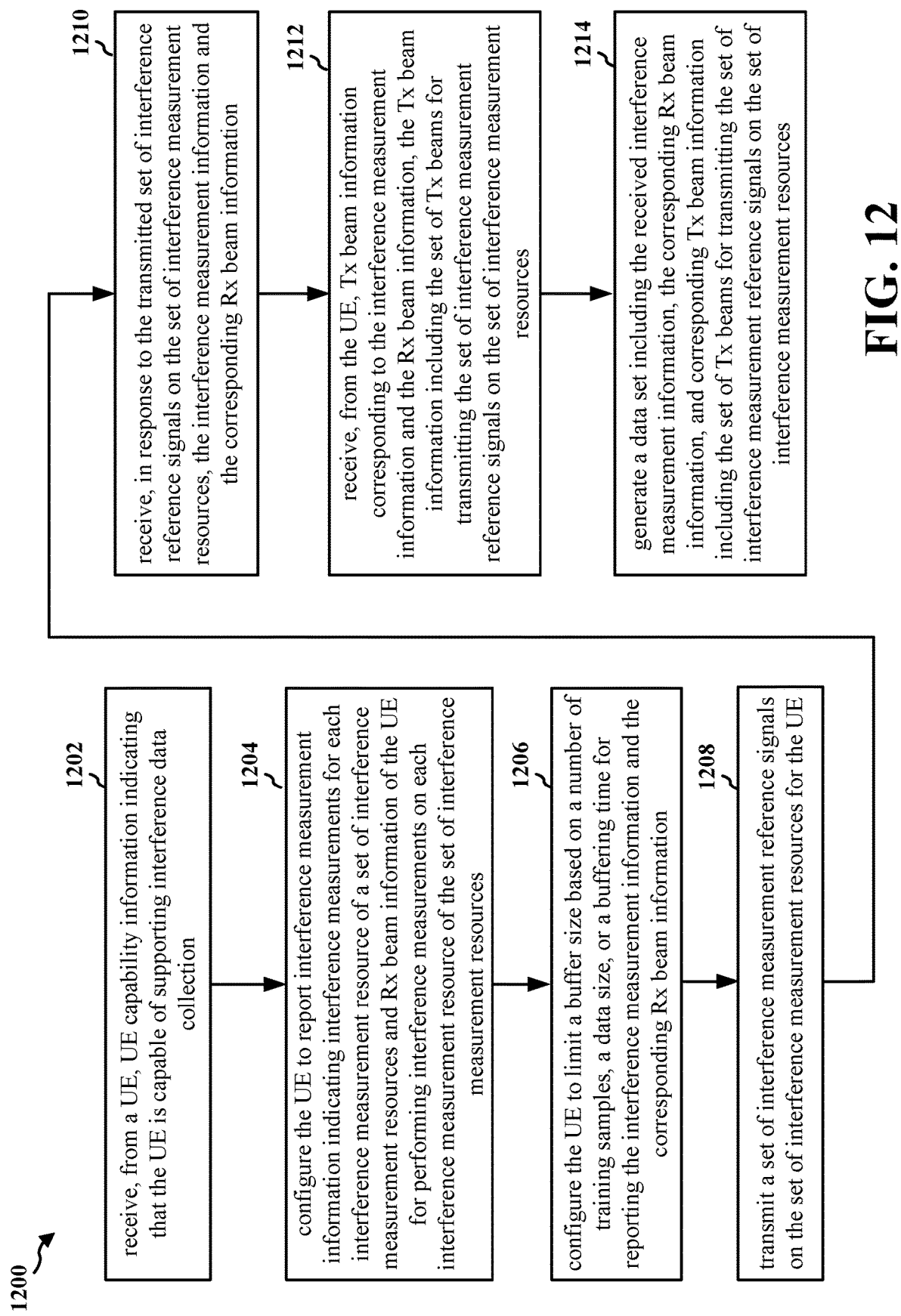
FIG. 12 is a second flowchart of a method of wireless communication at a network entity in accordance with various aspects of the present disclosure.

FIG. 12 is a flowchart 1200 of a method of wireless communication at a network entity in accordance with various aspects of the present disclosure. The method may be performed by a network entity. The network entity may be a base station, or a component of a base station, in the access network of FIG. 1 or a core network component (e.g., base station 102, 310; CU 110; DU 130; RU 140; network entity 720, 804; or network entity 1502 in the hardware implementation of FIG. 15). The method utilizes ML-based models to incorporate beam information for interference prediction, and thus improves the accuracy of predicting the interference behaviors on future resources.

As shown in FIG. 12, at 1204, the network entity may configure a UE to report interference measurement information indicating interference measurements for each interference measurement resource of a set of interference measurement resources and Rx beam information of the UE for performing interference measurements on each interference measurement resource of the set of interference measurement resources. The UE may be the UE 104, 350, 502, 730, 802, or the apparatus 1504 in the hardware implementation of FIG. 15. FIGS. 7 and 8 illustrate various aspects of the network entity configuring a UE to report interference measurement information for each interference measurement resource of a set of interference measurement resources and Rx beam information of the UE. For example, referring to FIGS. 7 and 8, the network entity 720/804 may configure, at 806, a UE 730/802 to report interference measurement information (see 1 of FIG. 7) indicating interference measurements for each interference measurement resource 710/810, 712/812 of a set of interference measurement resources 710/810, 712/812 and Rx beam information (820) of the UE 730/802 for performing interference measurements on each interference measurement resource 710/810, 712/812 of the set of interference measurement resources 710/810, 712/812.

At 1208, the network entity may transmit a set of interference measurement reference signals on the set of interference measurement resources for the UE. FIGS. 7 and 8 illustrate various aspects of the network entity transmitting a set of interference measurement reference signals on the set of interference measurement resources for the UE. For example, referring to FIGS. 7 and 8, the network entity 720/804 may transmit, at 808 (see also 2 of FIG. 7), a set of interference measurement reference signals (e.g., CSI-RS, CSI-IM, IMR) on the set of interference measurement resources 710/810, 712/812 for the UE 730/802.

At 1210, the network entity may receive, in response to the transmitted set of interference reference signals on the set of interference measurement resources, the interference measurement information and the corresponding Rx beam information. For example, the network entity 720/804 may receive, at 816 (see also 4 of FIG. 7), in response to the transmitted set of interference reference signals on the set of interference measurement resources 710/810, 712/812, the interference measurement information and the corresponding Rx beam information from the UE 730/802.

In some aspects, the interference measurement information and the corresponding Rx beam information may be training information for an ML-based interference prediction algorithm. The set of interference measurement resources may include a first set of interference measurement resources associated with inference measurements for inputs to the ML-based interference prediction algorithm, and a second set of interference measurement resources associated with interference measurements for predicted interference outputs of the ML-based interference prediction algorithm. The interference measurement information and the corresponding Rx beam information may include a set of input training information for inputs to the ML-based interference prediction algorithm, and a set of output training information for predicted interference outputs of the ML-based interference prediction algorithm.

For example, as shown in FIG. 6, the interference measurement information (Input 1) and the corresponding Rx beam information (Input 2) may be training information for an ML-based interference prediction algorithm (see FIG. 6). Referring to FIGS. 7 and 8, the set of interference measurement resources 710/810, 712/812 may include a first set of interference measurement resources 710/810 associated with inference measurements for inputs to the ML-based interference prediction algorithm, and a second set of interference measurement resources 712/812 associated with interference measurements for predicted interference outputs of the ML-based interference prediction algorithm. The interference measurement information and the corresponding Rx beam information may include a set of input training information (corresponding to 710/810) for inputs to the ML-based interference prediction algorithm, and a set of output training information (corresponding to 712/812) for predicted interference outputs of the ML-based interference prediction algorithm. As shown in FIG. 8, the UE 802 may, at 814, measure interference on each interference measurement resource 810, 812 of the set of interference measurement resources 810, 812 to obtain the interference measurement information, and each interference measurement may be through one Rx beam of a set of Rx beams 820. Hence, the interference measurement information and the corresponding Rx beam information may include a set of input training information (corresponding to 810) for inputs to the ML-based interference prediction algorithm and a set of output training information (corresponding to 812) for predicted interference output of the ML-based interference prediction algorithm.

The received Rx beam information may indicate the Rx beam in various ways. In some aspects, the received Rx beam information may indicate the azimuth beam angle, the elevation beam angle, the beam width, and the beam gain for each Rx beam used by the UE for performing the interference measurements on each interference measurement resource of the set of interference measurement resources. In some aspects, the received Rx beam information may indicate a variation in beam angles for a set of Rx beams used by the UE for performing the interference measurements on the set of interference measurement resources. In some aspects, the received Rx beam information may indicate an Rx beam interval index associated with an Rx beam used by the UE for performing the interference measurements on each interference measurement resource of the set of interference measurement resources.

In some aspects, the UE may be configured to report the interference measurement information and the Rx beam information for each Rx beam of the set of Rx beams and for each time window of a set of time windows. For example, in FIG. 8, the UE 802 may be configured, at 806, to report, at 816, the interference measurement information and the Rx beam information for each Rx beam of the set of Rx beams 820 and for each time window of a set of time windows.

In some aspects, the UE may be configured with information indicating specific Rx beams to use for each of the different subsets of the set of interference measurement resources when performing the interference measurements. For example, referring to FIG. 8, the UE 802 may be configured, at 806, with information indicating specific Rx beams 820 to use for each of the different subsets of the set of interference measurement resources 810, 812 when performing the interference measurements.

In some aspects, the set of interference measurement reference signals may be transmitted on the set of interference measurement resources through a set of Tx beams. Each interference measurement reference signal on one interference measurement resource may be transmitted through one Tx beam of the set of Tx beams. For example, referring to FIGS. 7 and 8, the set of interference measurement reference signals (808) may be transmitted on the set of interference measurement resources 710/810, 712/812 through a set of Tx beams 840. Each interference measurement reference signal (808) on one interference measurement resource 710/810, 712/812 may be transmitted through one Tx beam of the set of Tx beams 840.

At 1214, the network entity may generate a data set including the received interference measurement information, the corresponding Rx beam information, and corresponding Tx beam information including the set of Tx beams for transmitting the set of interference measurement reference signals on the set of interference measurement resources. For example, referring to FIGS. 8 and 10, the network entity 804 may, at 818, generate a data set including the received interference measurement information (e.g., 1002 in FIG. 10), the corresponding Rx beam information (e.g., 1004 in FIG. 10), and corresponding Tx beam information (e.g., 1006 in FIG. 10) including the set of Tx beams 840 for transmitting the set of interference measurement reference signals (808) on the set of interference measurement resources 810, 812.

In some aspects, the generated data set may include at least one of azimuth beam angles, elevation beam angles, beam gains, the variation in beam angles, or SSB beam indices associated with the set of Tx beams.

At 1212, the network entity may receive, from the UE, Tx beam information corresponding to the interference measurement information and the Rx beam information. The Tx beam information may include the set of Tx beams for transmitting the set of interference measurement reference signals on the set of interference measurement resources. For example, referring to FIGS. 8 and 10, the network entity 804 may receive, from the UE 802, Tx beam information (e.g., 1006 in FIG. 10) corresponding to the interference measurement information and the Rx beam information (e.g., 1004 in FIG. 10). The Tx beam information (e.g., 1006 in FIG. 10) may include the set of Tx beams 840 for transmitting the set of interference measurement reference signals on the set of interference measurement resources 810, 812.

In some aspects, the network entity may receive, from the UE, at least one of azimuth beam angles, elevation beam angles, beam gains, the variation in beam angles, or SSB beam indices associated with the set of Tx beams.

At 1206, the network entity may configure the UE to limit the buffer size based on the number of training samples, the data size, or the buffering time for reporting the interference measurement information and the corresponding Rx beam information. The interference measurement information and the corresponding Rx beam information may be received based on the configuration to limit the buffer size. For example, referring to FIG. 8, the network entity 804 may configure the UE 802 to limit the buffer size based on the number of training samples, the data size, or the buffering time for reporting the interference measurement information and the corresponding Rx beam information. The interference measurement information and the corresponding Rx beam information may be received based on the configuration to limit the buffer size.

In some aspects, the interference measurement information and the corresponding Rx beam information may be transmitted with a timestamp indicating a time at which each of the interference measurement information is obtained. For example, referring to FIGS. 8 and 9, the interference measurement information 902 and the corresponding Rx beam information 904 may be transmitted, at 816, with a timestamp indicating a time at which each of the interference measurement information is obtained.

In some aspects, the interference measurement information and the corresponding Rx beam information may be received with the maximum buffer size. The maximum buffer size may be one of the number of training samples, the data size, or the buffering time. For example, referring to FIGS. 8 and 9, the interference measurement information 902 and the corresponding Rx beam information 904 may be received, at 816, with the maximum buffer size. The maximum buffer size may be one of the number of training samples, the data size, or the buffering time.

At 1202, the network entity may receive, from a UE, UE capability information indicating that the UE is capable of supporting interference data collection. The network entity may configure the UE to report interference measurement information and Rx beam information in response to the received UE capability information. For example, referring to FIG. 8, the network entity 804 may receive, from a UE 802, UE capability information indicating that the UE is capable of supporting interference data collection. The network entity 804 may configure, at 806, the UE 802 to report interference measurement information and Rx beam information in response to the transmitted UE capability information.

Figure 13:
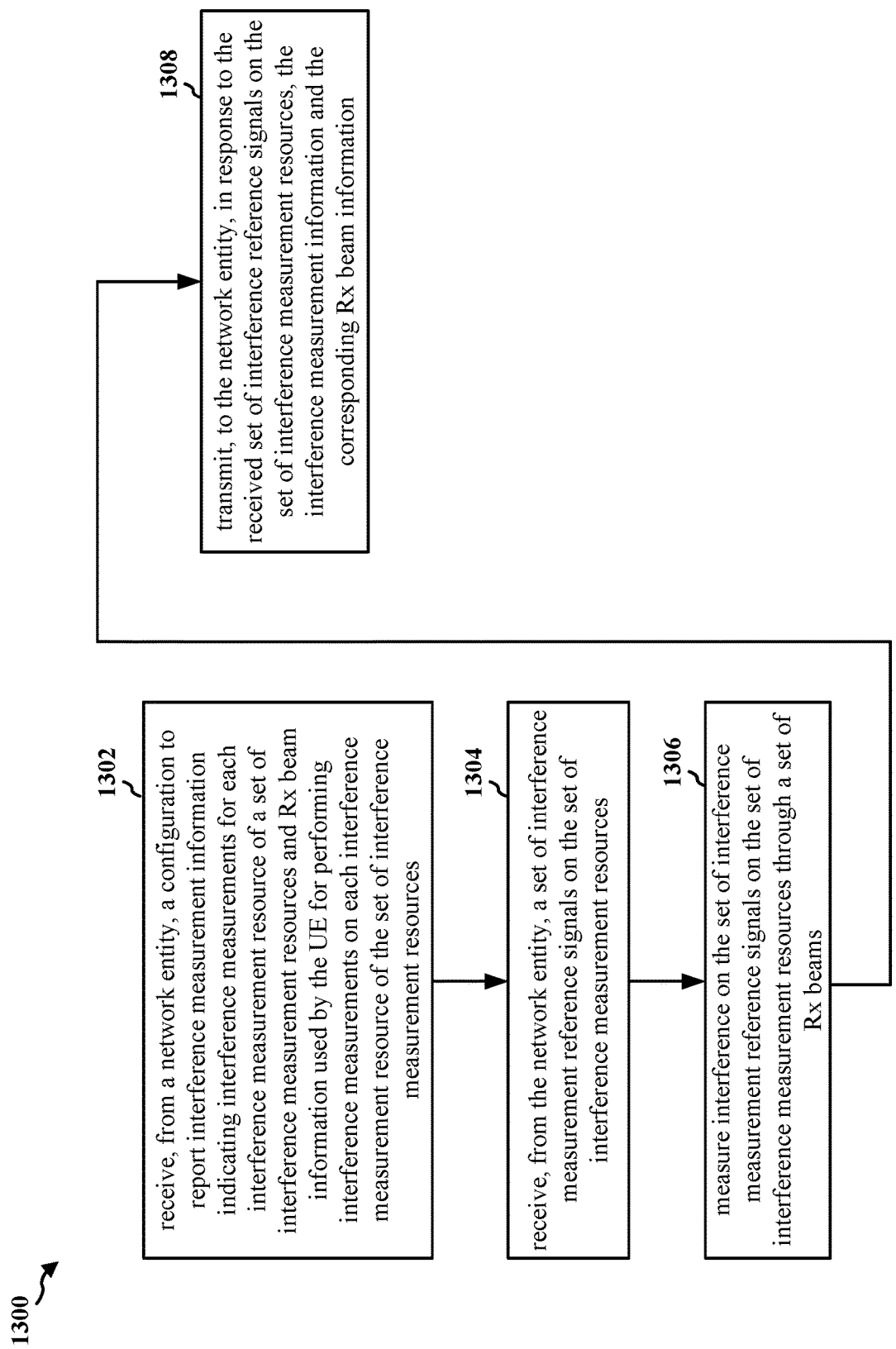
FIG. 13 is a first flowchart of a method of wireless communication at a UE in accordance with various aspects of the present disclosure.

FIG. 13 is a first flowchart 1300 of a method of wireless communication at a UE in accordance with various aspects of the present disclosure. The method may be performed by a UE. The UE may be the UE 104, 350, 502, 730, 802, or the apparatus 1504 in the hardware implementation of FIG. 15. The method utilizes ML-based models to incorporate beam information for interference prediction, and thus improves the accuracy of predicting the interference behaviors on future resources.

As shown in FIG. 13, at 1302, the UE may receive a configuration to report interference measurement information indicating interference measurements for each interference measurement resource of a set of interference measurement resources and Rx beam information used by the UE for performing interference measurements on each interference measurement resource of the set of interference measurement resources. The UE may receive the configuration from a network entity. The network entity may be a base station, or a component of a base station, in the access network of FIG. 1 or a core network component (e.g., base station 102, 310; CU 110; DU 130; RU 140; network entity 720, 804; or network entity 1502 in the hardware implementation of FIG. 15). FIGS. 7 and 8 illustrate various aspects of the UE receiving the configuration to report interference measurement information indicating interference measurements for each interference measurement of a set of interference measurement resources and the Rx beam information used by the UE. For example, referring to FIGS. 7 and 8, the UE 730, 802 may receive, from a network entity 720/804, at 806, a configuration to report interference measurement information indicating interference measurements for each interference measurement resource 710/810, 712/812 of a set of interference measurement resources 710/810, 712/812 and Rx beam information used by the UE 730/802 for performing, at 814, interference measurements on each interference measurement resource 710/810, 712/812 of the set of interference measurement resources 710/810, 712/812.

Figure 2:
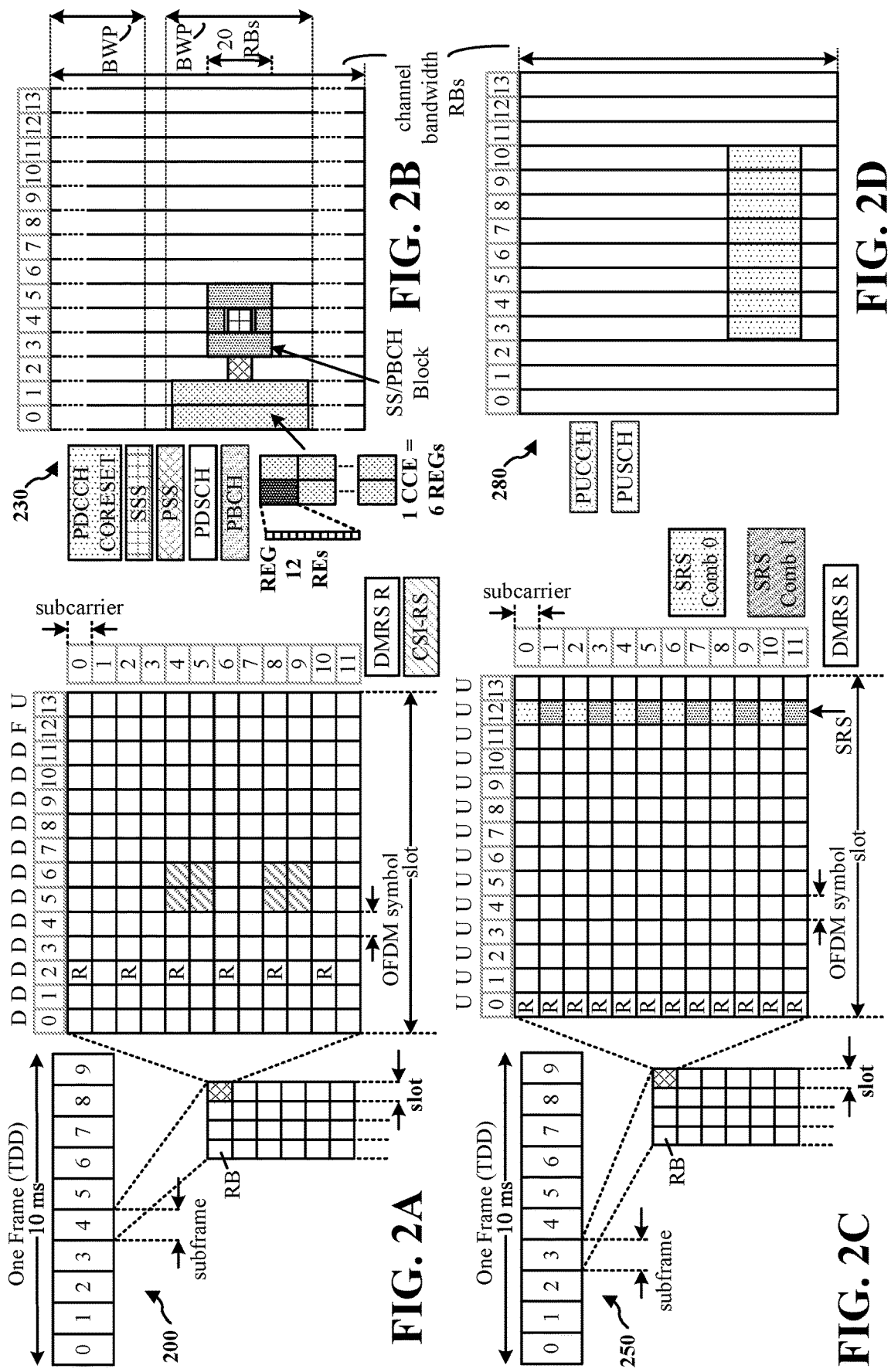
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

At 1304, the UE may receive, from the network entity, a set of interference measurement reference signals on the set of interference measurement resources. FIGS. 7 and 8 illustrate various aspects of the UE receiving a set of interference measurement reference signals on the set of interference measurement resources. For example, as shown in FIG. 7, through 2 and 3, the UE 730 may receive a set of interference measurement reference signals (e.g., CSI-RS, CSI-IM or IMR) on the set of interference measurement resources 710, 712. For another example, as shown in FIG. 8, the UE 802 may receive, at 808, from the network entity 804, a set of interference measurement reference signals on the set of interference measurement resources 810, 812.

At 1306, the UE may measure interference on each interference measurement resource of the set of interference measurement resources to obtain the interference measurement information. Each interference measurement may be through one Rx beam of a set of Rx beams. For example, as shown in FIG. 7, at 3, the UE 730 may measure interference on each interference measurement resource 710, 712 of the set of interference measurement resources 710, 712 to obtain the interference measurement information. As shown in FIG. 8, the UE 802 may, at 814, measure interference on each interference measurement resource 810, 812 of the set of interference measurement resources 810, 812 to obtain the interference measurement information. As shown in FIG. 8, each interference measurement may be through one Rx beam of a set of Rx beams 820.

At 1308, the UE may transmit, to the network entity, in response to the received set of interference reference signals on the set of interference measurement resources, the interference measurement information, and the corresponding Rx beam information. As shown in FIG. 8, the UE 802 may, at 816, transmit, to the network entity 804, in response to the received set of interference reference signals on the set of interference measurement resources 810, 812, the interference measurement information, and the corresponding Rx beam information.

Figure 14:
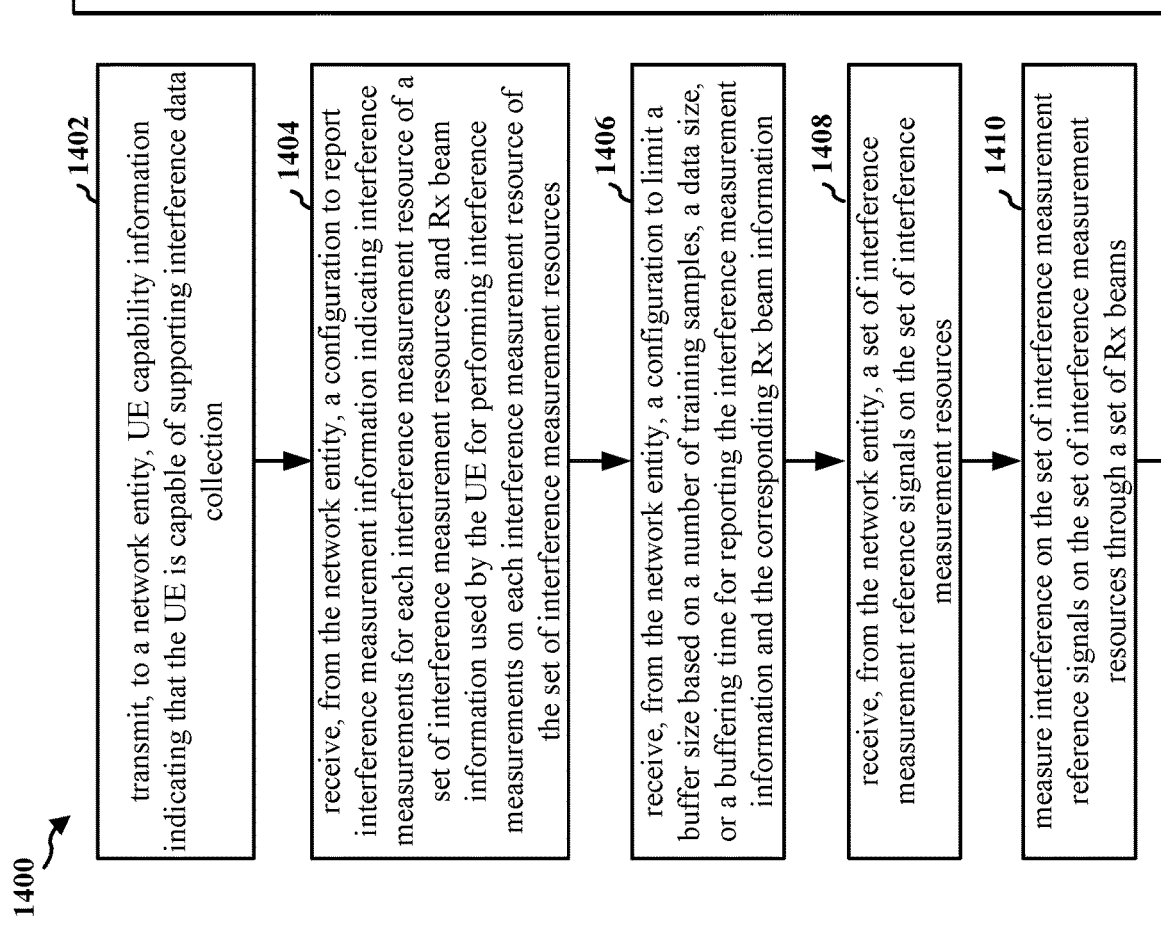
FIG. 14 is a second flowchart of a method of wireless communication at a UE in accordance with various aspects of the present disclosure.

FIG. 14 is a flowchart 1400 of a method of wireless communication at a UE in accordance with various aspects of the present disclosure. The method may be performed by a UE. The UE may be the UE 104, 350, 502, 730, 802, or the apparatus 1504 in the hardware implementation of FIG. 15. The method utilizes ML-based models to incorporate beam information for interference prediction, and thus improves the accuracy of predicting the interference behaviors on future resources.

As shown in FIG. 14, at 1404, the UE may receive a configuration to report interference measurement information indicating interference measurements for each interference measurement resource of a set of interference measurement resources and Rx beam information used by the UE for performing interference measurements on each interference measurement resource of the set of interference measurement resources. The UE may receive the configuration from a network entity. The network entity may be a base station, or a component of a base station, in the access network of FIG. 1 or a core network component (e.g., base station 102, 310; CU 110; DU 130; RU 140; network entity 720, 804; or network entity 1502 in the hardware implementation of FIG. 15). FIGS. 7 and 8 illustrate various aspects of the UE receiving the configuration to report interference measurement information indicating interference measurements for each interference measurement of a set of interference measurement resources and the Rx beam information used by the UE. For example, referring to FIGS. 7 and 8, the UE 730, 802 may receive, from a network entity 720/804, at 806, a configuration to report interference measurement information indicating interference measurements for each interference measurement resource 710/810, 712/812 of a set of interference measurement resources 710/810, 712/812 and Rx beam information used by the UE 730/802 for performing interference measurements on each interference measurement resource 710/810, 712/812 of the set of interference measurement resources 710/810, 712/812.

At 1408, the UE may receive, from the network entity, a set of interference measurement reference signals on the set of interference measurement resources. FIGS. 7 and 8 illustrate various aspects of the UE receiving a set of interference measurement reference signals on the set of interference measurement resources. For example, as shown in FIG. 7, through 2 and 3, the UE 730 may receive a set of interference measurement reference signals (e.g., CSI-RS, CSI-IM or IMR) on the set of interference measurement resources 710, 712. For another example, as shown in FIG. 8, the UE 802 may receive, at 808, from the network entity 804, a set of interference measurement reference signals on the set of interference measurement resources 810, 812.

At 1410, the UE may measure interference on each interference measurement resource of the set of interference measurement resources to obtain the interference measurement information. Each interference measurement may be through one Rx beam of a set of Rx beams. For example, as shown in FIG. 7, at 3, the UE 730 may measure interference on each interference measurement resource 710, 712 of the set of interference measurement resources 710, 712 to obtain the interference measurement information. As shown in FIG. 8, the UE 802 may, at 814, measure interference on each interference measurement resource 810, 812 of the set of interference measurement resources 810, 812 to obtain the interference measurement information. As shown in FIG. 8, each interference measurement may be through one Rx beam of a set of Rx beams 820.

At 1412, the UE may transmit, to the network entity, in response to the received set of interference reference signals on the set of interference measurement resources, the interference measurement information and the corresponding Rx beam information. As shown in FIG. 8, the UE 802 may, at 816, transmit, to the network entity 804, in response to the received set of interference reference signals on the set of interference measurement resources 810, 812, the interference measurement information and the corresponding Rx beam information.

In some aspects, the interference measurement information and the corresponding Rx beam information may be training information for an ML-based interference prediction algorithm. The set of interference measurement resources may include a first set of interference measurement resources associated with inference measurements for inputs to the ML-based interference prediction algorithm, and a second set of interference measurement resources associated with interference measurements for predicted interference outputs of the ML-based interference prediction algorithm. The interference measurement information and the corresponding Rx beam information may include a set of input training information for inputs to the ML-based interference prediction algorithm, and a set of output training information for predicted interference outputs of the ML-based interference prediction algorithm.

For example, as shown in FIG. 6, the interference measurement information (Input 1) and the corresponding Rx beam information (Input 2) may be training information for an ML-based interference prediction algorithm (see FIG. 6). Referring to FIGS. 7 and 8, the set of interference measurement resources 710/810, 712/812 may include a first set of interference measurement resources 710/810 associated with inference measurements for inputs to the ML-based interference prediction algorithm, and a second set of interference measurement resources 712/812 associated with interference measurements for predicted interference outputs of the ML-based interference prediction algorithm. The interference measurement information and the corresponding Rx beam information may include a set of input training information (corresponding to 710, 810) for inputs to the ML-based interference prediction algorithm, and a set of output training information (corresponding to 712, 812) for predicted interference outputs of the ML-based interference prediction algorithm. As shown in FIG. 8, the UE 802 may, at 814, measure interference on each interference measurement resource 810, 812 of the set of interference measurement resources 810, 812 to obtain the interference measurement information, and each interference measurement may be through one Rx beam of a set of Rx beams 820. Hence, the interference measurement information and the corresponding Rx beam information may include a set of input training information (corresponding to 810) for inputs to the ML-based interference prediction algorithm and a set of output training information (corresponding to 812) for predicted interference output of the ML-based interference prediction algorithm.

The transmitted Rx beam information may indicate the Rx beam in various ways. In some aspects, the transmitted Rx beam information may indicate the azimuth beam angle, the elevation beam angle, the beam width, and the beam gain for each Rx beam used by the UE for performing the interference measurements on each interference measurement resource of the set of interference measurement resources. In some aspects, the transmitted Rx beam information may indicate a variation in beam angles for a set of Rx beams used by the UE for performing the interference measurements on the set of interference measurement resources. In some aspects, the transmitted Rx beam information may indicate an Rx beam interval index associated with an Rx beam used by the UE for performing the interference measurements on each interference measurement resource of the set of interference measurement resources.

In some aspects, the UE may be configured to report the interference measurement information and the Rx beam information for each Rx beam of the set of Rx beams and for each time window of a set of time windows. For example, in FIG. 8, the UE 802 may be configured, at 806, to report, at 816, the interference measurement information and the Rx beam information for each Rx beam of the set of Rx beams 820 and for each time window of a set of time windows.

In some aspects, the UE may be configured with information indicating specific Rx beams to use for each of the different subsets of the set of interference measurement resources when performing the interference measurements. For example, referring to FIG. 8, the UE 802 may be configured, at 806, with information indicating specific Rx beams 820 to use for each of the different subsets of the set of interference measurement resources 810, 812 when performing the interference measurements.

In some aspects, the set of interference measurement reference signals may be received on the set of interference measurement resources through a set of Tx beams. Each interference measurement reference signal on one interference measurement resource may be received through one Tx beam of the set of Tx beams. For example, referring to FIGS. 7 and 8, the set of interference measurement reference signals (808) may be received on the set of interference measurement resources 710/810, 712/812 through a set of Tx beams 840. Each interference measurement reference signal (808) on one interference measurement resource 710/810, 712/812 may be received through one Tx beam of the set of Tx beams 840.

At 1414, the UE may generate a data set including the transmitted interference measurement information, the corresponding Rx beam information, and corresponding Tx beam information including the set of Tx beams through which the set of interference measurement reference signals on the set of interference measurement resources is received. The generated data set may include the interference measurement information and the corresponding Rx beam information and may be transmitted with the interference measurement information and the corresponding Rx beam information. For example, referring to FIGS. 8 and 10, the UE 802 may generate a data set including the received interference measurement information (e.g., 1002 in FIG. 10), the corresponding Rx beam information (e.g., 1004 in FIG. 10), and corresponding Tx beam information (e.g., 1006 in FIG. 10) including the set of Tx beams 840 through which the set of interference measurement reference signals (808) on the set of interference measurement resources 810, 812 is received.

In some aspects, the generated data set may include at least one of azimuth beam angles, elevation beam angles, beam gains, the variation in beam angles, or SSB beam indices associated with the set of Tx beams.

At 1416, the UE may, transmit, to the network entity, Tx beam information corresponding to the interference measurement information and the Rx beam information. The Tx beam information may include the set of Tx beams through which the set of interference measurement reference signals on the set of interference measurement resources is received. For example, referring to FIGS. 8 and 10, the UE 802 may transmit, to the network entity 804, Tx beam information (e.g., 1006 in FIG. 10) corresponding to the interference measurement information and the Rx beam information (e.g., 1004 in FIG. 10). The Tx beam information (e.g., 1006 in FIG. 10) may include the set of Tx beams 840 for transmitting the set of interference measurement reference signals on the set of interference measurement resources 810, 812.

In some aspects, the UE may transmit, to the network entity, at least one of azimuth beam angles, elevation beam angles, beam gains, the variation in beam angles, or SSB beam indices associated with the set of Tx beams.

At 1406, the UE may, receive, from the network entity, a configuration to limit the buffer size based on the number of training samples, the data size, or the buffering time for reporting the interference measurement information and the corresponding Rx beam information. The interference measurement information and the corresponding Rx beam information may be transmitted based on the configuration to limit the buffer size. For example, referring to FIG. 8, the UE 802 may receive, from the network entity 804, a configuration to limit the buffer size based on the number of training samples, the data size, or the buffering time for reporting the interference measurement information and the corresponding Rx beam information. The interference measurement information and the corresponding Rx beam information may be transmitted based on the configuration to limit the buffer size.

In some aspects, the interference measurement information and the corresponding Rx beam information may be transmitted with a timestamp indicating a time at which each of the interference measurement information is obtained. For example, referring to FIGS. 8 and 9, the interference measurement information 902 and the corresponding Rx beam information 904 may be transmitted, at 816, with a timestamp indicating a time at which each of the interference measurement information is obtained.

In some aspects, the interference measurement information and the corresponding Rx beam information may be transmitted with the maximum buffer size. The maximum buffer size may be one of the number of training samples, the data size, or the buffering time. For example, referring to FIGS. 8 and 9, the interference measurement information 902 and the corresponding Rx beam information 904 may be received, at 816, with the maximum buffer size. The maximum buffer size may be one of the number of training samples, the data size, or the buffering time.

At 1402, the UE may transmit, to the network entity, UE capability information indicating that the UE is capable of supporting interference data collection. The UE may receive the configuration to report interference measurement information in response to the transmitted UE capability information. For example, referring to FIG. 8, the UE 802 may transmit, to a network entity 804, UE capability information indicating that the UE 802 is capable of supporting interference data collection. The UE 802 may receive, at 806, the configuration to report interference measurement information and corresponding Rx beam information in response to the transmitted UE capability information.

Figure 15:
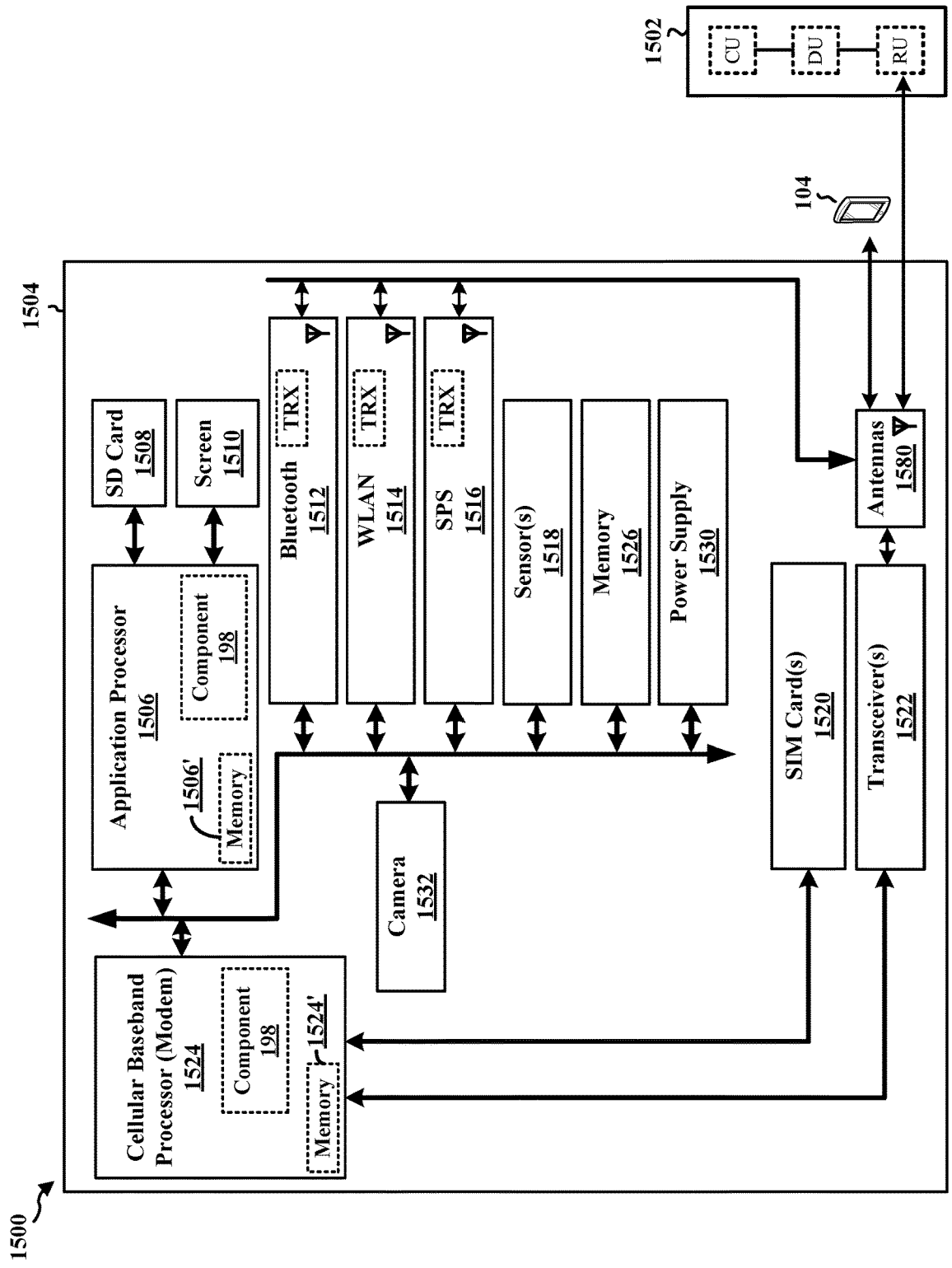
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see 350 of FIG. 3) and include the additional modules of the apparatus 1504.

As discussed supra, the component 198 is configured to receive a configuration to report interference measurement information indicating interference measurements for each interference measurement resource of a set of interference measurement resources and Rx beam information used by the UE for performing interference measurements on each interference measurement resource of the set of interference measurement resources. The component 198 may be further configured to receive a set of interference measurement reference signals on the set of interference measurement resources, measure interference on each interference measurement resource of the set of interference measurement resources to obtain the interference measurement information. Each interference measurement may be through one Rx beam of a set of Rx beams. The component 198 may be further configured to transmit, in response to the received set of interference reference signals on the set of interference measurement resources, the interference measurement information and the corresponding Rx beam information. The component 198 may be within the cellular baseband processor 1524, the application processor 1506, or both the cellular baseband processor 1524 and the application processor 1506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for receiving a configuration to report interference measurement information indicating interference measurements for each interference measurement resource of a set of interference measurement resources and Rx beam information used by the UE for performing interference measurements on each interference measurement resource of the set of interference measurement resources, means for receiving a set of interference measurement reference signals on the set of interference measurement resources, and means for measuring interference on each interference measurement resource of the set of interference measurement resources to obtain the interference measurement information. Each interference measurement may be through one Rx beam of a set of Rx beams. The apparatus 1504, and in particular the cellular baseband processor 1524 and/or the application processor 1506 may further include means for transmitting, in response to the received set of interference reference signals on the set of interference measurement resources, the interference measurement information and the corresponding Rx beam information. The apparatus 1504 may further include means for performing any of the aspects described in connection with the flowcharts in FIGS. 13 and 14, and/or the aspects performed by the UE in FIG. 8. The means may be the component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
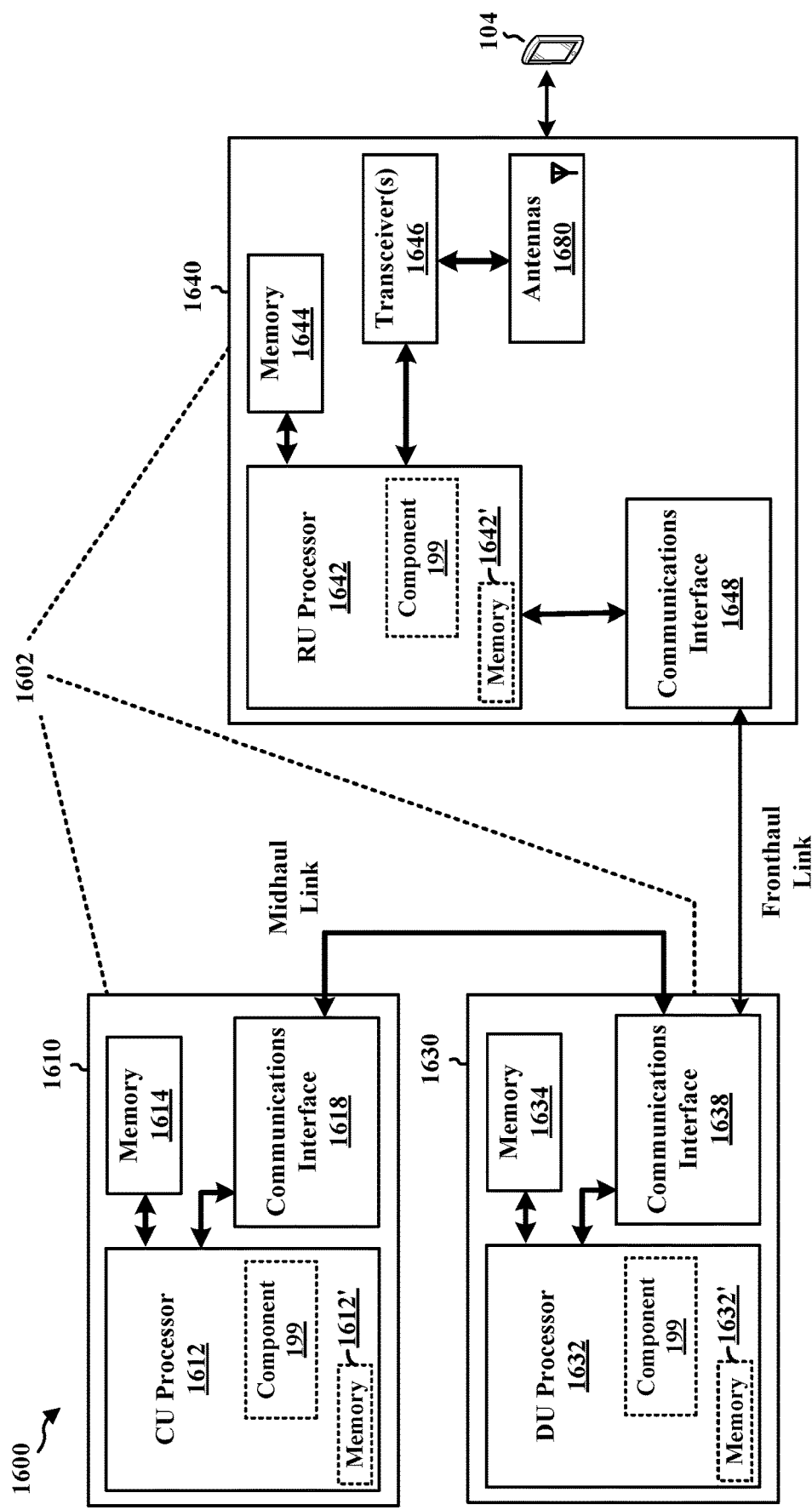
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to configure a UE to report interference measurement information indicating interference measurements for each interference measurement resource of a set of interference measurement resources and Rx beam information of the UE for performing interference measurements on each interference measurement resource of the set of interference measurement resources. The component 199 may be further configured to transmit a set of interference measurement reference signals on the set of interference measurement resources for the UE, and receive, in response to the transmitted set of interference reference signals on the set of interference measurement resources, the interference measurement information and the corresponding Rx beam information. The component 199 may be within one or more processors of one or more of the CU 1610, DU 1630, and the RU 1640. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 includes means for configuring a UE to report interference measurement information indicating interference measurements for each interference measurement resource of a set of interference measurement resources and Rx beam information of the UE for performing interference measurements on each interference measurement resource of the set of interference measurement resources, means for transmitting a set of interference measurement reference signals on the set of interference measurement resources for the UE, and means for receiving, in response to the transmitted set of interference reference signals on the set of interference measurement resources, the interference measurement information and the corresponding Rx beam information. The network entity 1602 may further include means for performing any of the aspects described in connection with the flowcharts in FIGS. 11 and 12, and/or the aspects performed by the base station in FIG. 8. The means may be the component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

Figure 17:
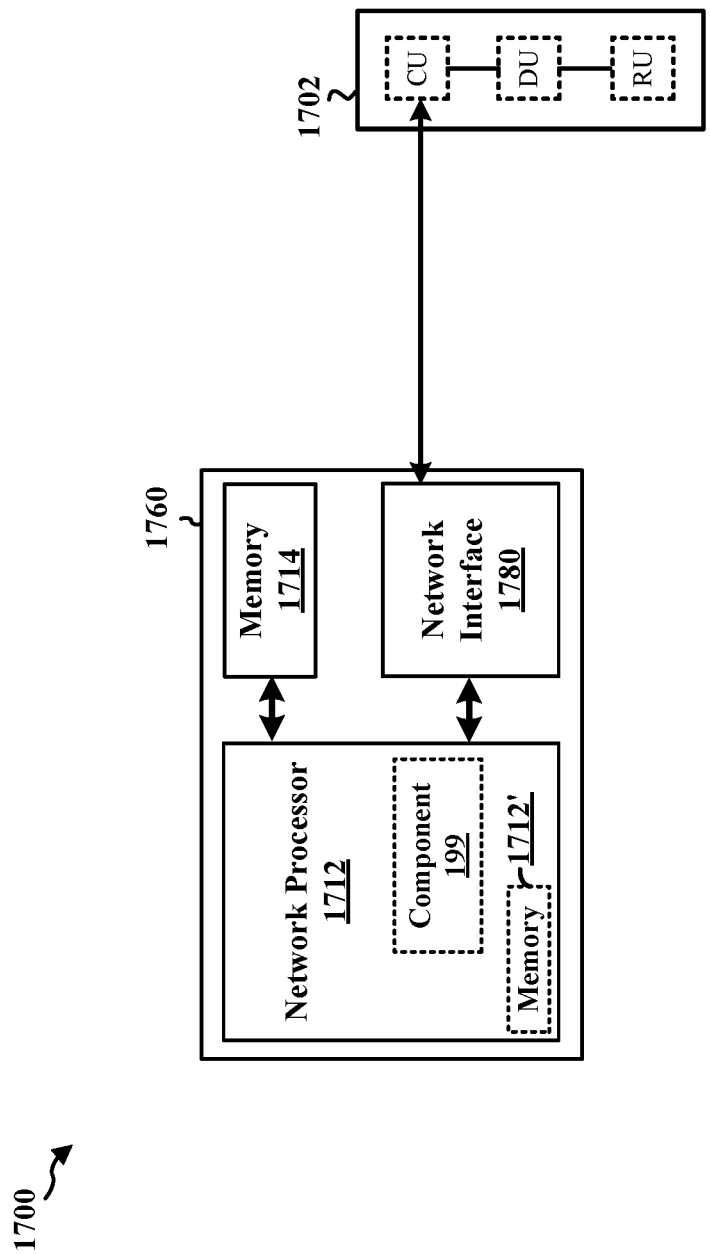
FIG. 17 is a diagram illustrating an example of a hardware implementation for an example network entity.

FIG. 17 is a diagram 1700 illustrating an example of a hardware implementation for a network entity 1760. In one example, the network entity 1760 may be within the core network 120. The network entity 1760 may include a network processor 1712. The network processor 1712 may include on-chip memory 1712'. In some aspects, the network entity 1760 may further include additional memory modules 1714. The network entity 1760 communicates via the network interface 1780 directly (e.g., backhaul link) or indirectly (e.g., through a RIC) with the CU 1702. The on-chip memory 1712' and the additional memory modules 1714 may each be considered a computer-readable medium/memory. Each computer-readable medium/memory may be non-transitory. The processor 1712 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to configure a UE to report interference measurement information indicating interference measurements for each interference measurement resource of a set of interference measurement resources and Rx beam information of the UE for performing interference measurements on each interference measurement resource of the set of interference measurement resources. The component 199 may be further configured to transmit a set of interference measurement reference signals on the set of interference measurement resources for the UE, and receive, in response to the transmitted set of interference reference signals on the set of interference measurement resources, the interference measurement information and the corresponding Rx beam information. The component 199 may be within the processor 1712. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1760 may include a variety of components configured for various functions. In one configuration, the network entity 1760 includes means for configuring a UE to report interference measurement information indicating interference measurements for each interference measurement resource of a set of interference measurement resources and Rx beam information of the UE for performing interference measurements on each interference measurement resource of the set of interference measurement resources, means for transmitting a set of interference measurement reference signals on the set of interference measurement resources for the UE, and means for receiving, in response to the transmitted set of interference reference signals on the set of interference measurement resources, the interference measurement information and the corresponding Rx beam information. The means may be the component 199 of the network entity 1760 configured to perform the functions recited by the means.

This disclosure provides methods and apparatus for interference data collection with beam information for ML-based interference prediction. In one aspect, the method may include configuring, by a network entity, a UE to report interference measurement information indicating interference measurements for each interference measurement resource of a set of interference measurement resources and Rx beam information of the UE for performing interference measurements on each interference measurement resource of the set of interference measurement resources. The method may further include transmitting a set of interference measurement reference signals on the set of interference measurement resources for the UE, and receiving, in response to the transmitted set of interference reference signals on the set of interference measurement resources, the interference measurement information and the corresponding Rx beam information. The method utilizes ML-based models to incorporate beam information for interference prediction, and thus improves the accuracy of predicting the interference behaviors on future resources.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network entity, including: configuring a UE to report interference measurement information indicating interference measurements for each interference measurement resource of a set of interference measurement resources and Rx beam information of the UE for performing interference measurements on each interference measurement resource of the set of interference measurement resources; transmitting a set of interference measurement reference signals on the set of interference measurement resources for the UE; and receiving, in response to the transmitted set of interference reference signals on the set of interference measurement resources, the interference measurement information and the corresponding Rx beam information.

Aspect 2 is the method of aspect 1, where the interference measurement information and the corresponding Rx beam information is training information for an ML-based interference prediction algorithm, the set of interference measurement resources includes a first set of interference measurement resources associated with inference measurements for inputs to the ML-based interference prediction algorithm, and a second set of interference measurement resources associated with interference measurements for predicted interference outputs of the ML-based interference prediction algorithm, and the interference measurement information and the corresponding Rx beam information includes a set of input training information for inputs to the ML-based interference prediction algorithm, and a set of output training information for predicted interference outputs of the ML-based interference prediction algorithm.

Aspect 3 is the method of any of aspects 1 and 2, where the received Rx beam information indicates one of: (1) the azimuth beam angle, the elevation beam angle, the beam width, and the beam gain for each Rx beam used by the UE for performing the interference measurements on each interference measurement resource of the set of interference measurement resources; (2) The variation in beam angles for a set of Rx beams used by the UE for performing the interference measurements on the set of interference measurement resources; and (3) The Rx beam interval index associated with an Rx beam used by the UE for performing the interference measurements on each interference measurement resource of the set of interference measurement resources.

Aspect 4 is the method of any of aspects 1 to 3, where the UE is configured to report the interference measurement information and the Rx beam information for each Rx beam of a set of Rx beams and for each time window of a set of time windows.

Aspect 5 is the method of any of aspects 1 to 4, where the UE is configured with information indicating specific Rx beams to use for each of the different subsets of the set of interference measurement resources when performing the interference measurements.

Aspect 6 is the method of any of aspects 1 to 5, where the set of interference measurement reference signals is transmitted on the set of interference measurement resources through a set of Tx beams, each interference measurement reference signal on one interference measurement resource being transmitted through one Tx beam of the set of Tx beams.

Aspect 7 is the method of aspect 6, where the method further includes generating a data set including the received interference measurement information, the corresponding Rx beam information, and corresponding Tx beam information including the set of Tx beams for transmitting the set of interference measurement reference signals on the set of interference measurement resources.

Aspect 8 is the method of aspect 7, where the generated data set includes at least one of azimuth beam angles, elevation beam angles, beam gains, a variation in beam angles, or SSB beam indices associated with the set of Tx beams.

Aspect 9 is the method of aspect 6, where the method further includes receiving, from the UE, Tx beam information corresponding to the interference measurement information and the Rx beam information, the Tx beam information including the set of Tx beams for transmitting the set of interference measurement reference signals on the set of interference measurement resources.

Aspect 10 is the method of aspect 9, where the method further includes receiving, from the UE, at least one of azimuth beam angles, elevation beam angles, beam gains, a variation in beam angles, or SSB beam indices associated with the set of Tx beams.

Aspect 11 is the method of any of aspects 1 to 10, where the method further includes configuring the UE to limit a buffer size based on the number of training samples, the data size, or the buffering time for reporting the interference measurement information and the corresponding Rx beam information. The interference measurement information and the corresponding Rx beam information are received based on the configuration to limit the buffer size.

Aspect 12 is the method of any of aspects 1 to 11, where the interference measurement information and the corresponding Rx beam information are received with a timestamp indicating a time at which each of the interference measurement information is obtained.

Aspect 13 is the method of any of aspects 1 to 12, where the interference measurement information and the corresponding Rx beam information are received with the maximum buffer size, the maximum buffer size being one of the number of training samples, the data size, or the buffering time.

Aspect 14 is the method of any of aspects 1 to 13, where the method further includes receiving, from the UE, UE capability information indicating that the UE is capable of supporting interference data collection, where the configuration is transmitted in response to the received UE capability information.

Aspect 15 is a method of wireless communication at a UE, including: receiving a configuration to report interference measurement information indicating interference measurements for each interference measurement resource of a set of interference measurement resources and Rx beam information used by the UE for performing interference measurements on each interference measurement resource of the set of interference measurement resources; receiving a set of interference measurement reference signals on the set of interference measurement resources; measuring interference on each interference measurement resource of the set of interference measurement resources to obtain the interference measurement information, each interference measurement being through one Rx beam of a set of Rx beams; and transmitting, in response to the received set of interference reference signals on the set of interference measurement resources, the interference measurement information and the corresponding Rx beam information.

Aspect 16 is the method of aspect 15, where the interference measurement information and the corresponding Rx beam information is training information for an ML-based interference prediction algorithm, the set of interference measurement resources includes a first set of interference measurement resources associated with inference measurements for inputs to the ML-based interference prediction algorithm, and a second set of interference measurement resources associated with interference measurements for predicted interference outputs of the ML-based interference prediction algorithm, and the interference measurement information and the corresponding Rx beam information includes a set of input training information for inputs to the ML-based interference prediction algorithm, and a set of output training information for predicted interference outputs of the ML-based interference prediction algorithm.

Aspect 17 is the method of any of aspects 15 and 16, where the transmitted Rx beam information indicates one of: (1) an azimuth beam angle, an elevation beam angle, a beam width, and a beam gain for each Rx beam used by the UE for performing the interference measurements on each interference measurement resource of the set of interference measurement resources; (2) a variation in beam angles for a set of Rx beams used by the UE for performing the interference measurements on the set of interference measurement resources; and (3) an Rx beam interval index associated with an Rx beam used by the UE for performing the interference measurements on each interference measurement resource of the set of interference measurement resources.

Aspect 18 is the method of any of aspects 15 to 17, where the UE is configured to report the interference measurement information and the Rx beam information for each Rx beam of the set of Rx beams and for each time window of a set of time windows.

Aspect 19 is the method of aspect 18, where the UE is configured with information indicating specific Rx beams to use for each of the different subsets of the set of interference measurement resources when performing the interference measurements.

Aspect 20 is the method of any of aspects 15 to 19, where the set of interference measurement reference signals is received on the set of interference measurement resources through a set of Tx beams, each interference measurement reference signal on one interference measurement resource being received through one Tx beam of the set of Tx beams.

Aspect 21 is the method of aspect 20, where the method further includes generating a data set including the transmitted interference measurement information, the corresponding Rx beam information, and corresponding Tx beam information including the set of Tx beams through which the set of interference measurement reference signals is received on the set of interference measurement resources is received, where the generated data set includes the interference measurement information and the corresponding Rx beam information and is transmitted with the interference measurement information and the corresponding Rx beam information.

Aspect 22 is the method of aspect 21, where the generated data set includes at least one of azimuth beam angles, elevation beam angles, beam gains, a variation in beam angles, or SSB beam indices associated with the set of Tx beams.

Aspect 23 is the method of aspect 20, where the method further includes transmitting Tx beam information corresponding to the interference measurement information and the Rx beam information, the Tx beam information including the set of Tx beams through which the set of interference measurement reference signals on the set of interference measurement resources is received.

Aspect 24 is the method of aspect 23, where the method further includes transmitting at least one of azimuth beam angles, elevation beam angles, beam gains, a variation in beam angles, or SSB beam indices associated with the set of Tx beams.

Aspect 25 is the method of any of aspects 15 to 24, where the method further includes receiving a configuration to limit a buffer size based on the number of training samples, the data size, or the buffering time for reporting the interference measurement information and the corresponding Rx beam information, where the interference measurement information and the corresponding Rx beam information is transmitted based on the configuration to limit the buffer size.

Aspect 26 is the method of any of aspects 15 to 25, where the interference measurement information and the corresponding Rx beam information is transmitted with a timestamp indicating a time at which each of the interference measurement information is obtained.

Aspect 27 is the method of any of aspects 15 to 26, where the interference measurement information and the corresponding Rx beam information is transmitted with the maximum buffer size, the maximum buffer size being one of the number of training samples, the data size, or the buffering time.

Aspect 28 is the method of any of aspects 15 to 27, where the method further includes transmitting UE capability information indicating that the UE is capable of supporting interference data collection, where the configuration is received in response to the transmitted UE capability information.

Aspect 29 is an apparatus for wireless communication at a network entity, including: a memory; and at least one processor coupled to the memory and, based at least in part on information stored in the memory, the at least one processor is configured to perform the method of any of aspects 1-14.

Aspect 30 is the apparatus of aspect 29, where the apparatus further includes at least one of a transceiver or an antenna coupled to the at least one processor.

Aspect 31 is an apparatus for wireless communication including means for implementing the method of any of aspects 1-14.

Aspect 32 is a computer-readable medium (e.g., a non-transitory computer-readable medium) storing computer executable code, where the code when executed by a processor causes the processor to implement the method of any of aspects 1-14.

Aspect 33 is an apparatus for wireless communication at a UE, including: a memory; and at least one processor coupled to the memory and, based at least in part on information stored in the memory, the at least one processor is configured to perform the method of any of aspects 15-28.

Aspect 34 is the apparatus of aspect 33, where the apparatus further includes at least one of a transceiver or an antenna coupled to the at least one processor.

Aspect 35 is an apparatus for wireless communication including means for implementing the method of any of aspect 15-28.

Aspect 36 is a computer-readable medium (e.g., a non-transitory computer-readable medium) storing computer executable code, where the code when executed by a processor causes the processor to implement the method of any of aspects 15-28.

What is claimed is:

1. An apparatus for wireless communication at a network entity, comprising:
   memory; and
   at least one processor coupled to the memory and, based at least in part on information stored in the memory, the at least one processor is configured to:
   configure a user equipment (UE) to report interference measurement information indicating interference measurements for each interference measurement resource of a set of interference measurement resources and receive (Rx) beam information of the UE for performing interference measurements on each interference measurement resource of the set of interference measurement resources, wherein the interference measurement information and the corresponding Rx beam information is training information for a machine learning (ML) based interference prediction algorithm, and the interference measurement information and the corresponding Rx beam information comprise a set of input training information for inputs to the ML-based interference prediction algorithm, and a set of output training information for predicted interference outputs of the ML-based interference prediction algorithm;
   transmit a set of interference measurement reference signals on the set of interference measurement resources for the UE; and
   receive, in response to the transmitted set of interference reference signals on the set of interference measurement resources, the interference measurement information and the corresponding Rx beam information.

2. The apparatus of claim 1, wherein
the set of interference measurement resources comprises a first set of interference measurement resources associated with inference measurements for inputs to the ML-based interference prediction algorithm, and a second set of interference measurement resources associated with interference measurements for predicted interference outputs of the ML-based interference prediction algorithm.

3. The apparatus of claim 1, wherein the Rx beam information indicates at least one of:
   (1) an azimuth beam angle, an elevation beam angle, a beam width, and a beam gain for each Rx beam used by the UE for performing the interference measurements on each interference measurement resource of the set of interference measurement resources;
   (2) a variation in beam angles for a set of Rx beams used by the UE for performing the interference measurements on the set of interference measurement resources; and
   (3) an Rx beam interval index associated with an Rx beam used by the UE for performing the interference measurements on each interference measurement resource of the set of interference measurement resources.

4. The apparatus of claim 1, wherein the UE is configured to report the interference measurement information and the Rx beam information for each Rx beam of a set of Rx beams and for each time window of a set of time windows.

5. The apparatus of claim 4, wherein the UE is configured with information indicating specific Rx beams to use for each of different subsets of the set of interference measurement resources when performing the interference measurements.

6. The apparatus of claim 1, wherein to transmit the set of interference measurement reference signals, the at least one processor is configured to transmit the set of interference measurement reference signals on the set of interference measurement resources through a set of transmit (Tx) beams, each interference measurement reference signal on one interference measurement resource being transmitted through one Tx beam of the set of Tx beams.

7. The apparatus of claim 6, wherein the at least one processor is further configured to:
   generate a data set including the received interference measurement information, the corresponding Rx beam information, and corresponding Tx beam information including the set of Tx beams for transmitting the set of interference measurement reference signals on the set of interference measurement resources.

8. The apparatus of claim 7, wherein the generated data set includes at least one of azimuth beam angles, elevation beam angles, beam gains, a variation in beam angles, or synchronization signal block (SSB) beam indices associated with the set of Tx beams.

9. The apparatus of claim 6, wherein the at least one processor is further configured to:
   receive, from the UE, Tx beam information corresponding to the interference measurement information and the Rx beam information, the Tx beam information including the set of Tx beams for transmitting the set of interference measurement reference signals on the set of interference measurement resources.

10. The apparatus of claim 9, wherein the at least one processor is further configured to:
    receive, from the UE, at least one of azimuth beam angles, elevation beam angles, beam gains, a variation in beam angles, or synchronization signal block (SSB) beam indices associated with the set of Tx beams.

11. The apparatus of claim 1, wherein the at least one processor is further configured to:
    configure the UE to limit a buffer size based on a number of training samples, a data size, or a buffering time for reporting the interference measurement information and the corresponding Rx beam information, wherein the interference measurement information and the corresponding Rx beam information are received based on the configuration to limit the buffer size.

12. The apparatus of claim 1, wherein the interference measurement information and the corresponding Rx beam information are received with a timestamp indicating a time at which each of the interference measurement information is obtained.

13. The apparatus of claim 1, wherein the interference measurement information and the corresponding Rx beam information are received with a maximum buffer size, the maximum buffer size being one of a number of training samples, a data size, or a buffering time.

14. The apparatus of claim 1, wherein the at least one processor is further configured to:
receive, from the UE, UE capability information indicating that the UE is capable of supporting interference data collection, wherein the at least one processor is configured to configure the UE to report interference measurement information and Rx beam information in response to the received UE capability information.

15. An apparatus for wireless communication at a user equipment (UE), comprising:
memory; and
at least one processor coupled to the memory and, based at least in part on information stored in the memory, the at least one processor is configured to:
receive a configuration to report interference measurement information indicating interference measurements for each interference measurement resource of a set of interference measurement resources and receive (Rx) beam information used by the UE for performing interference measurements on each interference measurement resource of the set of interference measurement resources, wherein the interference measurement information and the corresponding Rx beam information is training information for a machine learning (ML) based interference prediction algorithm, and wherein the interference measurement information and the corresponding Rx beam information comprise a set of input training information for inputs to the ML-based interference prediction algorithm, and a set of output training information for predicted interference outputs of the ML-based interference prediction algorithm;
receive a set of interference measurement reference signals on the set of interference measurement resources;
measure interference on each interference measurement resource of the set of interference measurement resources to obtain the interference measurement information, each interference measurement being through one Rx beam of a set of Rx beams; and
transmit, in response to the received set of interference reference signals on the set of interference measurement resources, the interference measurement information and the corresponding Rx beam information.

16. The apparatus of claim 15, wherein
the set of interference measurement resources comprises a first set of interference measurement resources associated with inference measurements for inputs to the ML-based interference prediction algorithm, and a second set of interference measurement resources associated with interference measurements for predicted interference outputs of the ML-based interference prediction algorithm.

17. The apparatus of claim 15, wherein the transmitted Rx beam information indicates at least one of:
(1) an azimuth beam angle, an elevation beam angle, a beam width, and a beam gain for each Rx beam used by the UE for performing the interference measurements on each interference measurement resource of the set of interference measurement resources;
(2) a variation in beam angles for a set of Rx beams used by the UE for performing the interference measurements on the set of interference measurement resources; and
(3) an Rx beam interval index associated with an Rx beam used by the UE for performing the interference measurements on each interference measurement resource of the set of interference measurement resources.

18. The apparatus of claim 15, wherein the UE is configured to report the interference measurement information and the Rx beam information for each Rx beam of the set of Rx beams and for each time window of a set of time windows.

19. The apparatus of claim 18, wherein the UE is configured with information indicating specific Rx beams to use for each of different subsets of the set of interference measurement resources when performing the interference measurements.

20. The apparatus of claim 15, wherein to receive the set of interference measurement reference signals, the at least one processor is configured to receive the set of interference measurement reference signals on the set of interference measurement resources through a set of transmit (Tx) beams, each interference measurement reference signal on one interference measurement resource being received through one Tx beam of the set of Tx beams.

21. The apparatus of claim 20, wherein the at least one processor is further configured to:
generate a data set including the transmitted interference measurement information, the corresponding Rx beam information, and corresponding Tx beam information including the set of Tx beams through which the set of interference measurement reference signals on the set of interference measurement resources is configured to be received, wherein the generated data set includes the interference measurement information and the corresponding Rx beam information and is configured to be transmitted with the interference measurement information and the corresponding Rx beam information.

22. The apparatus of claim 21, wherein the generated data set includes at least one of azimuth beam angles, elevation beam angles, beam gains, a variation in beam angles, or synchronization signal block (SSB) beam indices associated with the set of Tx beams.

23. The apparatus of claim 20, wherein the at least one processor is further configured to:
transmit Tx beam information corresponding to the interference measurement information and the Rx beam information, the Tx beam information including the set of Tx beams through which the set of interference measurement reference signals on the set of interference measurement resources is configured to be received.

24. The apparatus of claim 23, wherein the at least one processor is further configured to:
transmit at least one of azimuth beam angles, elevation beam angles, beam gains, a variation in beam angles, or synchronization signal block (SSB) beam indices associated with the set of Tx beams.

25. The apparatus of claim 15, wherein the at least one processor is further configured to:
receive a configuration to limit a buffer size based on a number of training samples, a data size, or a buffering time for reporting the interference measurement information and the corresponding Rx beam information, wherein the interference measurement information and the corresponding Rx beam information is transmitted based on the configuration to limit the buffer size.

26. The apparatus of claim 15, wherein to transmit the interference measurement information and the corresponding Rx beam information, the at least one processor is configured to transmit the interference measurement information and the corresponding Rx beam information with a timestamp indicating a time at which each of the interference measurement information is obtained.

27. The apparatus of claim 15, wherein to transmit the interference measurement information and the corresponding Rx beam information, the at least one processor is configured to transmit the interference measurement information and the corresponding Rx beam information with a maximum buffer size, the maximum buffer size being one of a number of training samples, a data size, or a buffering time.

28. The apparatus of claim 15, wherein the at least one processor is further configured to:
transmit UE capability information indicating that the UE is capable of supporting interference data collection, wherein to receive the configuration to report interference measurement information and Rx beam information, the at least one processor is configured to receive the configuration to report interference measurement information and Rx beam information in response to the transmitted UE capability information.

29. A method of wireless communication at a network entity, comprising:
configuring a user equipment (UE) to report interference measurement information indicating interference measurements for each interference measurement resource of a set of interference measurement resources and receive (Rx) beam information of the UE for performing interference measurements on each interference measurement resource of the set of interference measurement resources, wherein the interference measurement information and the corresponding Rx beam information is training information for a machine learning (ML) based interference prediction algorithm, and the interference measurement information and the corresponding Rx beam information comprise a set of input training information for inputs to the ML-based interference prediction algorithm, and a set of output training information for predicted interference outputs of the ML-based interference prediction algorithm;
transmitting a set of interference measurement reference signals on the set of interference measurement resources for the UE; and
receiving, in response to the transmitted set of interference reference signals on the set of interference measurement resources, the interference measurement information and the corresponding Rx beam information.

30. A method of wireless communication at a user equipment (UE), comprising:
receiving a configuration to report interference measurement information indicating interference measurements for each interference measurement resource of a set of interference measurement resources and receive (Rx) beam information used by the UE for performing interference measurements on each interference measurement resource of the set of interference measurement resources, wherein the interference measurement information and the corresponding Rx beam information is training information for a machine learning (ML) based interference prediction algorithm, and wherein the interference measurement information and the corresponding Rx beam information comprise a set of input training information for inputs to the ML-based interference prediction algorithm, and a set of output training information for predicted interference outputs of the ML-based interference prediction algorithm;
receiving a set of interference measurement reference signals on the set of interference measurement resources;
measuring interference on each interference measurement resource of the set of interference measurement resources to obtain the interference measurement information, each interference measurement being through one Rx beam of a set of Rx beams; and
transmitting, in response to the received set of interference reference signals on the set of interference measurement resources, the interference measurement information and the corresponding Rx beam information.

* * * * *